US008625535B2

(12) United States Patent
Ishida et al.

(10) Patent No.: US 8,625,535 B2
(45) Date of Patent: Jan. 7, 2014

(54) RADIO TRANSMITTING/RECEIVING APPARATUS AND METHOD, TERMINAL APPARATUS, BASE STATION APPARATUS AND WIRELESS COMMUNICATION SYSTEM

(75) Inventors: Chie Ishida, Kanagawa (JP); Takahisa Aoyama, Kanagawa (JP)

(73) Assignee: Panasonic Corporation, Osaka (JP)

( * ) Notice: Subject to any disclaimer, the term of this patent is extended or adjusted under 35 U.S.C. 154(b) by 140 days.

(21) Appl. No.: 13/126,124

(22) PCT Filed: Oct. 19, 2009

(86) PCT No.: PCT/JP2009/005447
§ 371 (c)(1),
(2), (4) Date: Apr. 26, 2011

(87) PCT Pub. No.: WO2010/050140
PCT Pub. Date: May 6, 2010

(65) Prior Publication Data
US 2011/0206011 A1    Aug. 25, 2011

(30) Foreign Application Priority Data
Oct. 30, 2008    (JP) ................................. 2008-279389

(51) Int. Cl.
*H04W 4/00*    (2009.01)
*H04W 36/00*    (2009.01)
*H04W 40/00*    (2009.01)

(52) U.S. Cl.
USPC ............ 370/331; 370/338; 455/436; 455/446

(58) Field of Classification Search
None
See application file for complete search history.

(56) References Cited

U.S. PATENT DOCUMENTS

| 2004/0192221 | A1  | 9/2004 | Matsunaga |
| 2007/0097938 | A1* | 5/2007 | Nylander et al. ............. 370/338 |
| 2009/0047960 | A1* | 2/2009 | Gunnarsson et al. ......... 455/436 |

(Continued)

FOREIGN PATENT DOCUMENTS

| CN | 1535045 | 10/2004 |
| CN | 1802006 | 7/2006 |

(Continued)

OTHER PUBLICATIONS

International Search Report dated Jan. 8, 2010.

(Continued)

*Primary Examiner* — Melanie Jagannathan
(74) *Attorney, Agent, or Firm* — Seed IP Law Group PLLC

(57) ABSTRACT

A terminal apparatus (1) which is a radio transmitting/receiving apparatus receives, from a femto cell base station (home eNB), a pilot channel signal for reception quality measurement and a synchronization channel signal for synchronization. The terminal apparatus (1) has a whitelist stored therein indicative of an accessible femto cell, and determines whether or not a CSG cell of handover destination is accessible based on a PCI of the CSG cell acquired from the synchronization channel and the whitelist. The terminal apparatus (1) then adds the PCI and a CGI to a measurement report for reception quality, and transmits the measurement report to a macro eNB (base station apparatus (2)). In this way, it is possible to suppress wasteful signaling and prevent unnecessary resources from being reserved even when two or more CSG cells that use the same PCI are present in the macro cell.

9 Claims, 19 Drawing Sheets

(56) References Cited

U.S. PATENT DOCUMENTS

| | | | |
|---|---|---|---|
| 2009/0047968 A1* | 2/2009 | Gunnarsson et al. | 455/446 |
| 2009/0092097 A1* | 4/2009 | Nylander et al. | 370/331 |
| 2009/0093252 A1* | 4/2009 | Czaja et al. | 455/436 |
| 2010/0029283 A1 | 2/2010 | Iwamura | |
| 2010/0298017 A1* | 11/2010 | Dalsgaard et al. | 455/507 |
| 2010/0323663 A1* | 12/2010 | Vikberg et al. | 455/410 |
| 2011/0103347 A1* | 5/2011 | Dimou | 370/331 |

FOREIGN PATENT DOCUMENTS

| | | |
|---|---|---|
| JP | 2004-304339 | 10/2004 |
| JP | 2007-266732 | 10/2007 |
| WO | 2007/075463 | 7/2007 |
| WO | 2008/081816 | 7/2008 |

OTHER PUBLICATIONS

3GPP TS 36.331 V8.3.0 Technical Specification Group Radio Access Network; Evolved Universal Terrestrial Radio Access (E-UTRA) Radio Resource Control (RRC); Protocol specification (Release 8),: Sep. 2008, pp. 1-78.

3GPP TSG RAN WG2 62bis, Tdoc-R2-083268, "Optimized handover In the presence of PCI confusion," Jul. 2008, pp. 1-5.

Russian Office Action dated Apr. 22, 2013, with English translation.

3GPP TSG-RAN WG2#61, "Identification and Measurement of CSG cells," R2-081114, Feb. 11-15, 2008, pp. 1-2.

3GPP TSG-RAN WG2 Meeting #58bis, "E-UTRA Measurements and Cell Reselection Considerations," R2-072386, R2-071727, Jun. 25-29, 2007, pp. 1-5.

Chinese Office Action dated Jul. 1, 2013 with its English translation.

* cited by examiner

RADIO TRANSMITTING/RECEIVING APPARATUS AND METHOD, TERMINAL APPARATUS, BASE STATION APPARATUS AND WIRELESS COMMUNICATION SYSTEM

TECHNICAL FIELD

The present invention relates to a radio transmitting/receiving apparatus and method for use in a terminal apparatus and a base station apparatus that constitute a wireless communication system, and particularly to a technique for performing a handover from a macro cell to a CSG cell.

BACKGROUND ART

Conventionally, the Long Term Evolution (LTE) system is known as a network system for wireless communication between a base station and a terminal apparatus. The LTE system is a mobile communication system of next generation evolved from the Universal Mobile Telecommunications System (UMTS) and is intended to provide more improved mobile communication services.

In the LTE, in addition to a macro cell wireless communication base station apparatus (Evolved NodeB, or eNB) that is primarily located outdoors and supports a larger cell diameter, it is under consideration to provide a femto cell wireless communication base station apparatus, which supports a cell diameter on the order of tens of meters, in indoor facilities such as a residence, an office, a restaurant, and a shopping center. Some femto cell wireless communication base station apparatuses under consideration in the 3rd Generation Partnership Project (3GPP) permit limited groups of members to access the base station apparatuses. Such cells are referred to as a Closed Subscriber Group cell, or CSG cell. A wireless communication base station apparatus that forms a CSG cell is referred to as a Home Evoled NodeB, or HeNB. The macro eNB can, for example, manage two or more different frequency bands (f1, f2, ..., fn), and the home eNB may be located on a frequency f1.

A wireless communication terminal apparatus (User Equipment, or UE) permitted to have an access is controlled from the network so as to connect to the home eNB. Specifically, once in the area of the CSG cell, the terminal apparatus is controlled to preferentially connect to the home eNB even if the terminal apparatus can receive radio signals from the eNB. A list of CSG cells that the terminal is permitted to access is referred to as a whitelist. Each of terminal apparatuses has its own whitelist.

Description will now be made to a control method of performing a handover from a macro eNB to a home eNB in a conventional LTE. (refer to, for example, Patent Literature 1 and Non-Patent Literature 1)

An active UE generally receives a measurement control message through a Dedicated Control Channel, or DCCH, from the eNB to which the UE is connected. The measurement control message provides settings for taking reception quality measurements of the current cell and an adjacent cell. The measurement control message includes parameters such as a frequency and a system to be measured, event information that triggers transmission of a measurement report to the base station, a signal used in the measurement, and a duration (gap) for performing the measurement. The UE measures reception quality of the adjacent cell through a pilot channel (Common Pilot Channel, or CPICH) according to the settings from the measurement control message, and transmits the reception quality measurement result in a report (measurement report) to the eNB in a periodical manner or triggered by a configured event.

It is assumed here that the UE moves to the vicinity of the border of the CSG cell. The UE measures the reception quality of the CSG cell, during which the UE acquires a physical cell ID (Physical Cell Identity, or PCI) of the CSG cell by receiving a Synchronization Channel, or SCH. In particular, one PCI is determined among 510 PCIs by a combination of a signal pattern of a Primary Synchronization Channel (P-SCH) and a pattern of a pair of (S1, S2) or (S2, S1) determined from an Secondary Synchronization Channel (S-SCH). The UE then notifies the macro eNB of the PCI of the CSG cell subjected to the measurement and the measurement result.

The macro eNB retains a list of CSG cells contained in the macro cell, and the list of CSG cells include PCIs for each home eNB and a Cell Global Identity, or CGI. The macro eNB that has received the measurement result of the CSG cell notified by the UE determines a home eNB that has the corresponding PCI from the list of CSG cells contained in the macro cell, and transmits an inquiry (HO request) of whether the UE may be allowed to perform a handover via a Mobility Management Entity (MME)/Gateway (GW) to the home eNB. If the handover of the UE is to be permitted; the home eNB that has received the HO request reserves in advance wireless resources appropriate for services provided to the UE, performs acceptance control, and transmits a response (an ACK to the HO request) that permits the handover of the UE via the MME/GW to the macro eNB.

Upon receiving the ACK to the HO request from the home eNB, the macro eNB transmits an instruction (HO command) causing a transfer to the CSG cell to the UE, and the UE transmits a random access preamble (RACH preamble) in order to establish synchronization with the specified home eNB. Thereafter, when the UE receives a response (random access response, or RACH response) from the home eNB, the UE establishes synchronization with the home eNB and an uplink transmission opportunity is assigned to the UE from the home eNB. Once the synchronization is established, the UE transmits a signal (HO confirmation) indicative of the completion of handover to the home eNB.

CITATION LIST

Patent Literature

Patent Literature 1: Japanese Patent Laid-Open No. 2007-266732

Non-Patent Literature

Non-Patent Literature 1: 3GPP TS36.331 v8.3.0 "Evolved Universal Terrestrial Radio Access (E-UTRA) Radio Resource Control (RRC)"

In the conventional handover control method, however, UEs deliver reports to eNBs with reference to only PCIs of CSG cells. Therefore, if two or more CSG cells that use the same PCI are present in the macro cell for example, the macro eNB may transmit HO requests to more than one home eNB in response to the measurement report sent from the UE. In such a case, there may be wasteful signaling to home eNBs different from the home eNB on which the UE actually measured the reception quality. Further, home eNBs, which are different from the home eNB on which the UE actually measured the reception quality, may reserve unnecessary resources for the UE.

SUMMARY OF INVENTION

Technical Problem

The present invention has been made under such circumstances. It is an object of the invention to provide a radio transmitting/receiving apparatus capable of suppressing wasteful signaling and preventing unnecessary resources from being reserved even when two or more CSG cells that use the same PCI are present in the macro cell.

Solution to Problem

One aspect of the invention is a radio transmitting/receiving apparatus, and the radio transmitting/receiving apparatus comprises: a reception unit for receiving, from a macro cell base station, an instruction for handover to a femto cell contained in a macro cell and receiving, from a femto cell base station, a pilot channel signal for reception quality measurement at the femto cell and a synchronization channel signal for synchronization; a storage unit for storing a list indicative of an accessible femto cell among femto cells contained in the macro cell; a determination unit for determining whether or not a femto cell of handover destination is accessible based on a physical cell ID of the femto cell acquired from the received synchronization channel and the list; a measurement report creating unit for adding a physical cell ID and a unique cell ID to a measurement report indicative of a result of measurements taken by means of the pilot channel signal, the physical cell ID being acquired from the synchronization channel and being indicative of a femto cell from which a signal is being received and the unique cell ID being for uniquely identifying a femto cell contained in the macro cell and being indicative of the femto cell of handover destination determined to be accessible; and a transmission unit for transmitting the measurement report to the macro cell.

As described below, the present invention has other aspects. Therefore, the disclosure of the invention is intended to provide some of the aspects of the invention, and is not intended to limit the scope of the invention as described and claimed herein.

DESCRIPTION OF EMBODIMENTS

Figure 1:
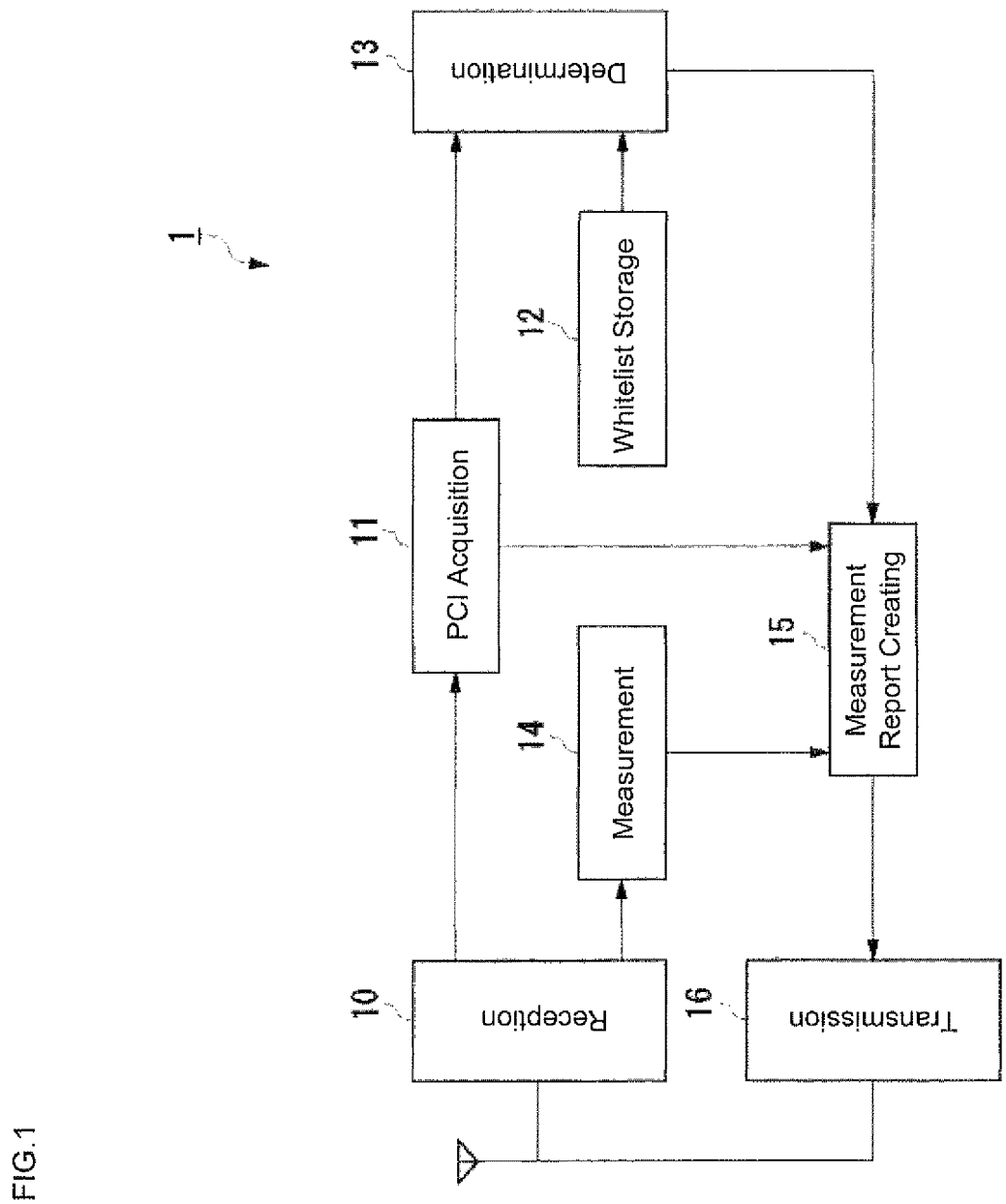
FIG. 1 is a block diagram showing a configuration of a terminal apparatus according to a first embodiment.

The present invention will now be described in detail. However, the detailed description below and attached drawings are not intended to limit the present invention. Rather, the scope of the invention is defined by the attached claims.

The radio transmitting/receiving apparatus according to the invention comprises: a reception unit for receiving, from a macro cell base station, an instruction for handover to a femto cell contained in a macro cell and receiving, from a femto cell base station, a pilot channel signal for measurement at the femto cell and a synchronization channel signal for synchronization; a storage unit for storing a list indicative of an accessible femto cell among femto cells contained in the macro cell; a determination unit for determining whether or not a femto cell of handover destination is accessible based on a physical cell ID of the femto cell acquired from the received synchronization channel and the list; a measurement report creating unit for adding a physical cell ID and a unique cell ID to a measurement report indicative of a result of measurements taken by means of the pilot channel signal, the physical cell ID being acquired from the synchronization channel and being indicative of a femto cell from which a signal is being received and the unique cell ID being for uniquely identifying a femto cell contained in the macro cell and being indicative of the femto cell of handover destination determined to be accessible; and a transmission unit for transmitting the measurement report to the macro cell.

With this configuration, not only the physical cell ID (such as PCI) of a femto cell (such as a CSG cell) from which a signal is being received, but also a unique cell ID (such as CGI) of the femto cell of handover destination is added to the measurement report of the radio quality. Therefore, even when two or more CSG cells that use the same PCI are present in the macro cell for example, an accessible CSG cell (a CSG cell of handover destination) can be identified based on the CGI. In this way, it is possible to suppress wasteful signaling to home eNBs of inaccessible CSG cells and prevent unnecessary resources from being reserved.

The present invention adds not only the physical cell ID of a femto cell from which a signal is being received but also a unique cell ID of the femto cell of handover destination to the measurement report, and can thereby suppress wasteful signaling and prevent unnecessary resources from being reserved.

A wireless communication system according to embodiments of the present invention will now be described below with reference to drawings. The wireless communication system according to the embodiments includes a terminal apparatus with radio transmitting/receiving functions (such as mobile phones and PDA devices) and a base station apparatus with radio transmitting/receiving functions. The terminal apparatus and the base station apparatus are also considered as a radio transmitting/receiving apparatus.

(First Embodiment)

Figure 2:
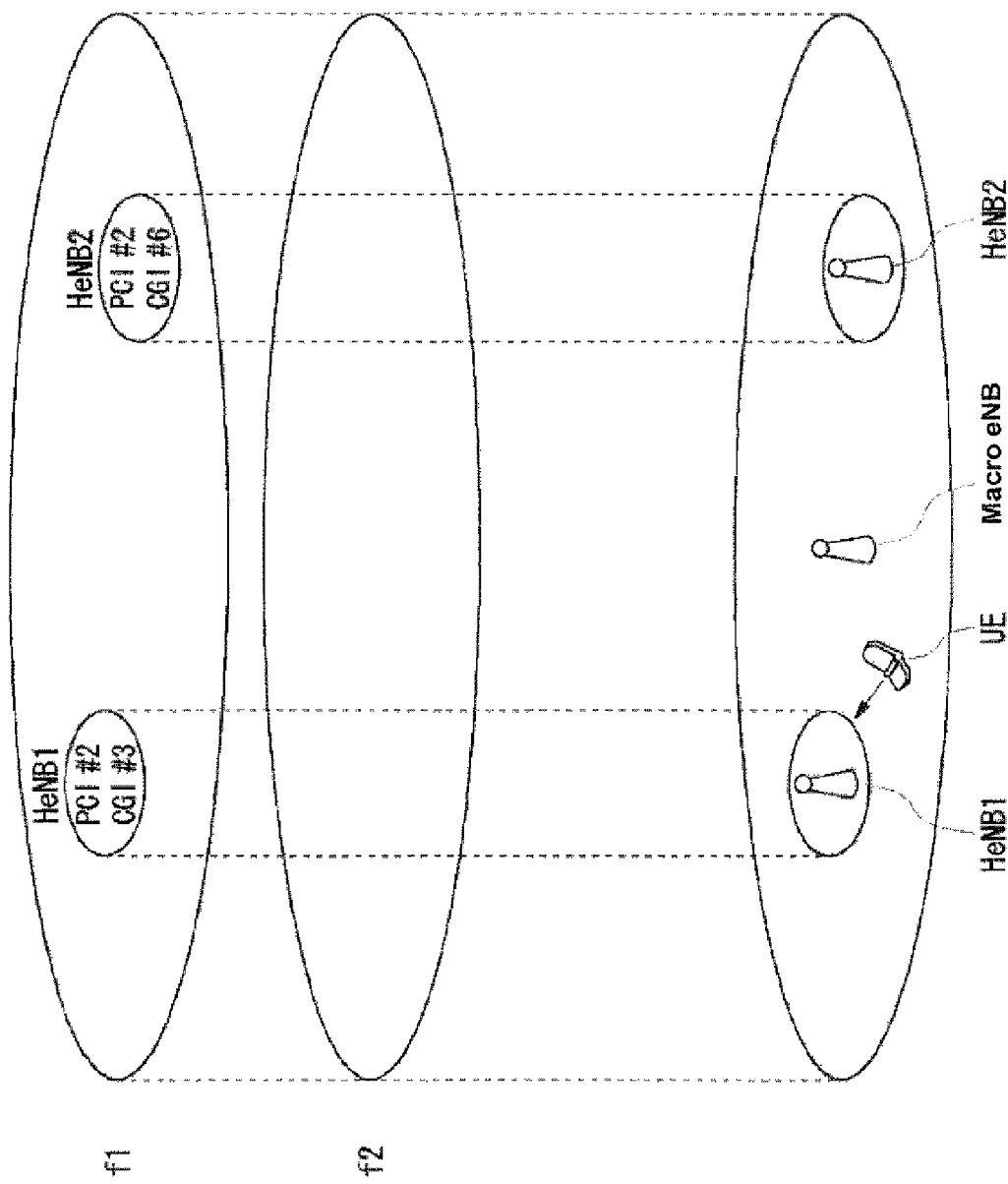
FIG. 2 is a diagram for illustrating a cell arrangement according to the first embodiment.
Figure 3:
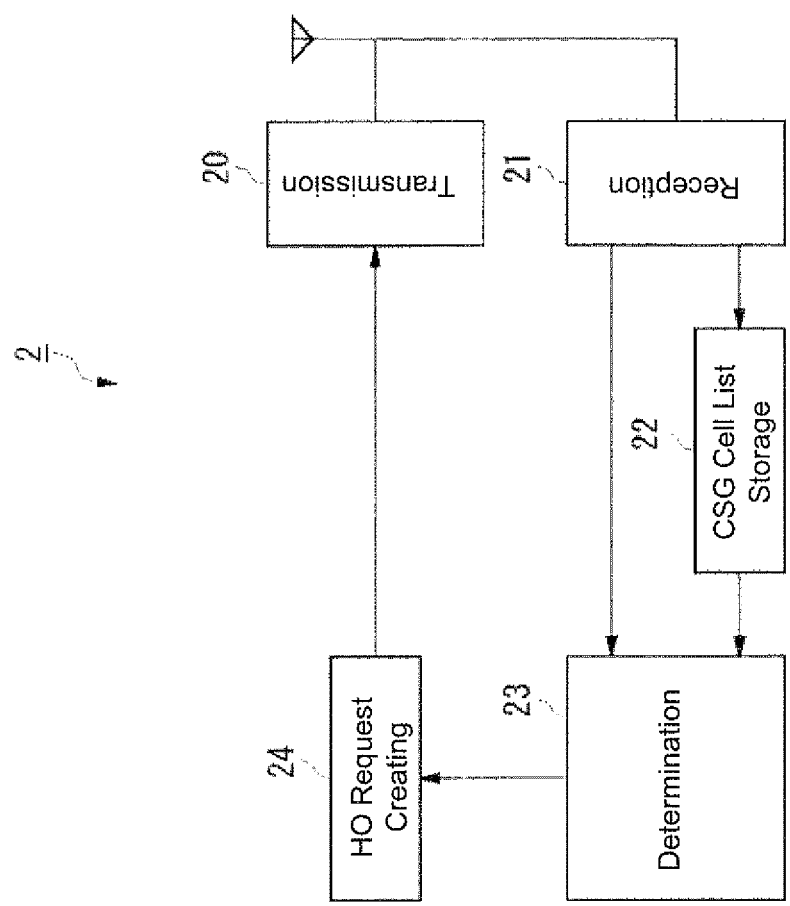
FIG. 3 is a block diagram showing a configuration of a base station apparatus according to the first embodiment.

A wireless communication system according to a first embodiment of the present invention will now be described below with reference to FIGS. 1 to 6. FIG. 1 is a block diagram showing a configuration of a terminal apparatus 1 according to the embodiment; FIG. 2 is a diagram for illustrating a cell arrangement according to the embodiment; and FIG. 3 is a block diagram showing a configuration of a base station apparatus 2 according to the embodiment.

First, a cell arrangement according to the embodiment will be described with reference to FIG. 2. In an example shown in FIG. 2, a macro eNB manages macro cells having two different frequency bands (f1, f2), and CSG cells managed by two home eNBs (HeNB 1 and HeNB 2) are both located on the macro cell of frequency f1. PCIs of the two CSG cells are both "PCI #2" and both PCIs are the same. In other words, two CSG cells that use the same PCI are present in one macro cell in this case. Meanwhile, CGIs of the two CSG cells are "CGI #3" for one CSG cell and "CGI #6" for the other and the two CGIs are different. Here, the macro eNB corresponds to a macro cell base station of the invention. The CSG cell corresponds to a femto cell of the invention, and the home eNB corresponds to a femto cell base station of the invention. Further, the PCI corresponds to a physical cell ID of the invention, and the CGI corresponds to a unique cell ID of the invention.

Next, a configuration of the terminal apparatus 1 according to the embodiment will be described with reference to the block diagram in FIG. 1. As shown in FIG. 1, the terminal apparatus 1 (UE) comprises a reception unit 10, a PCI acquisition unit 11, a whitelist storage unit 12, a determination unit 13, a measurement unit 14, a measurement report creating unit 15, and a transmission unit 16.

The reception unit 10 receives a pilot channel for reception quality measurement at a CSG cell as well as a synchronization channel for PCI acquisition from a home eNB, and receives a handover command (HO command) from the macro eNB.

The PCI acquisition unit 11 acquires a PCI from the synchronization channel information input from the reception unit 10, and outputs the acquired PCI to the determination unit 13 and the measurement report creating unit 15. The whitelist storage unit 12 stores a list of PCIs and CGIs of CSG cells that the terminal apparatus 1 is permitted to access. The information of the whitelist is output to the determination unit 13.

The determination unit 13 determines a CGI of a CSG cell accessible to the terminal apparatus 1 based on the PCI input from the PCI acquisition unit 11 and the information input from the whitelist storage unit 12, and outputs the CGI to the measurement report creating unit 15. The measurement unit 14 measures reception quality based on the pilot channel input from the reception unit 10, and outputs the result to the measurement report creating unit 15.

The measurement report creating unit 15 creates a measurement report based on the PCI input from the PCI acquisition unit 11, the CGI of the CSG cell input from the determination unit 13 (the CGI of the CSG cell that the terminal apparatus 1 desires to enter), and the reception quality input from the measurement unit 14. The created measurement report is output to the transmission unit 16. The transmission unit 16 transmits the measurement report input from the measurement report creating unit 15 to the macro eNB through an antenna.

Next, a configuration of the base station apparatus 2 according to the embodiment will be described with reference to the block diagram in FIG. 3. As shown in FIG. 3, the base station apparatus 2 (macro eNB) comprises a transmission unit 20, a reception unit 21, a CSG cell list storage unit 22, a determination unit 23, and an HO request creating unit 24.

The transmission unit 20 transmits an HO request input from the HO request creating unit 24 to the terminal apparatus 1. The reception unit 21 receives a measurement report from the terminal apparatus 1. The reception unit 21 also receives a list of CSG cells contained in the macro cell from the MME/GW. The CSG cell list storage unit 22 stores the CSG cell list input from the reception unit 21, which has been sent from the MME/GW. The CSG cell list information is input to the determination unit 23.

The determination unit 23 compares the measurement report output from the reception unit 21, which has been sent from the terminal apparatus 1, with the CSG cell list output from the CSG cell list storage unit 22 to extract a CSG cell corresponding to the PCI included in the measurement report from the terminal apparatus 1, and outputs an instruction to create an HO request for the corresponding CSG cell to the HO request creating unit 24. The HO request creating unit 24 creates the HO request in response to the instruction from the determination unit 23 and outputs the HO request to the transmission unit 20.

The operation of a thus configured wireless communication system will be described with reference to FIGS. 4 to 6.

First, as a characteristic operation of the invention, description will be made to the operation (i.e. signaling) of the entire system in the case of the cell arrangement as shown in FIG. 2 when the terminal apparatus 1 that is camping on the macro cell is to handover to one of two CSG cells having the same PCI (i.e. the CSG cell [PC1 #2, CGT #3] of HeNB 1).

Figure 4:
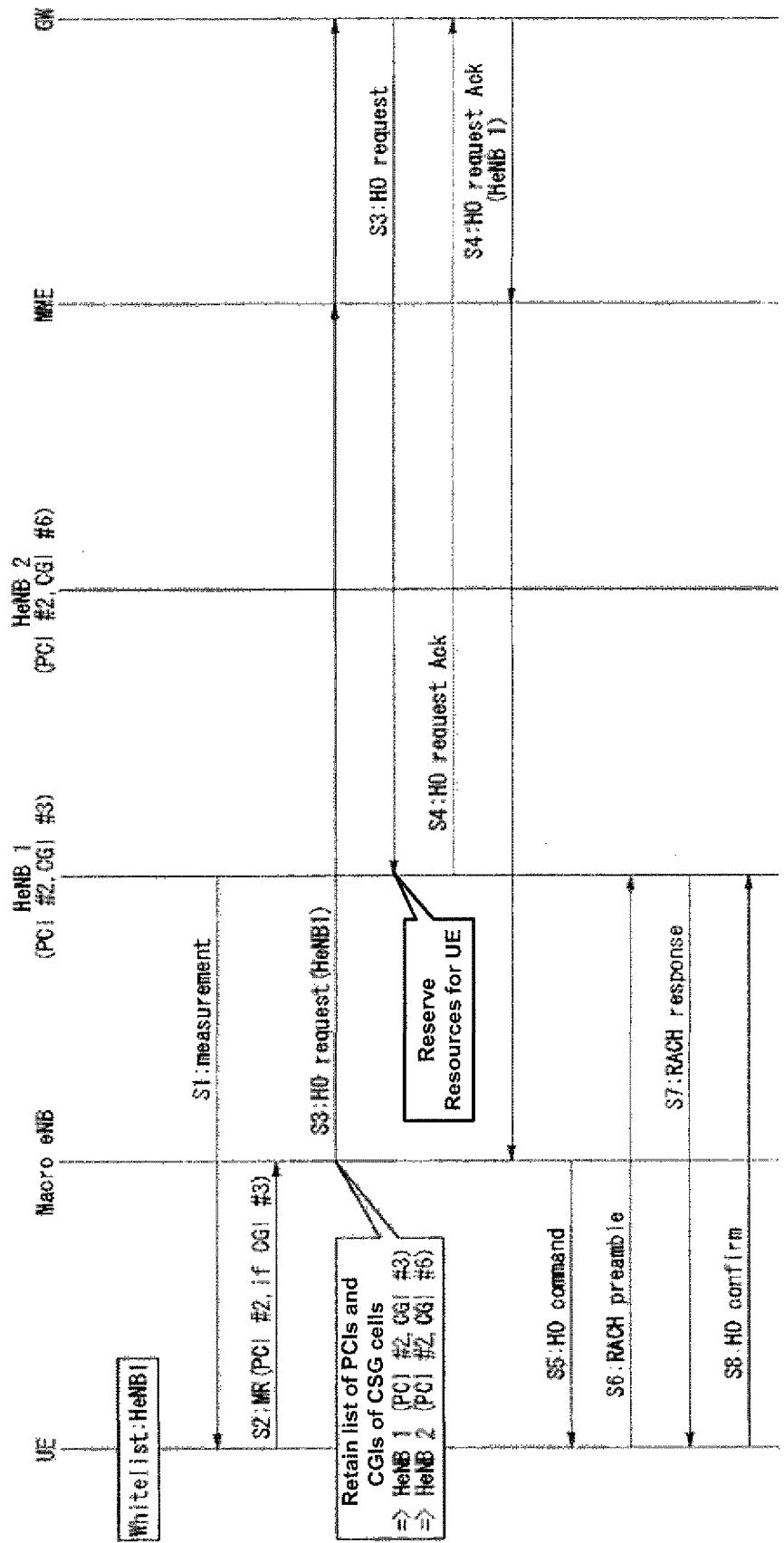
FIG. 4 is a sequence diagram for illustrating an operation of a wireless communication system according to the first embodiment.

FIG. 4 is a sequence diagram showing the operation of the wireless communication system according to the embodiment. As shown in FIG. 4, the terminal apparatus 1 takes reception quality measurements of the home eNB 1 (S1), and acquires the PC1 (here, PCI #2). The terminal apparatus 1 adds the PCI of the home eNB 1 subjected to the measurement and the CGI (here, CGT #3) of an accessible CSG cell corresponding to the PCI (the CSG cell that the terminal apparatus 1 desires to enter) to the measurement result, and notifies the base station apparatus 2 (macro eNB) of a resultant measurement report MR (PCI #2, if CGI #3) (S2).

The base station apparatus 2 (macro eNB) determines a home eNB that has the "PCI" and "if CGI" notified from the terminal apparatus 1 (here, the home eNB 1), and transmits an HO request to the home eNB 1 through a Mobility Management Entity (MME)/Gateway (GW) (S3). If the handover of the terminal apparatus 1 is to be permitted, the home eNB 1 that has received the HO request reserves in advance wireless resources appropriate for services provided to the terminal apparatus 1, performs acceptance control, and transmits an ACK to the HO request via the MME/GW to the base station apparatus 2 (macro eNB) (S4).

Upon receiving the ACK to the HO request from the home eNB 1, the base station apparatus 2 (macro eNB) transmits an HO command for instructing the terminal apparatus 1 to transfer to the CSG cell 1 (S5), and the terminal apparatus 1 transmits a random access preamble to the specified home eNB (S6). After the home eNB transmits a random access response (S7) and synchronization is established, the terminal apparatus 1 transmits an HO confirmation to the home eNB 1 (S8).

Next, the operation of components of the wireless communication system (the terminal apparatus 1 and the base station apparatus 2) will be described.

Figure 5:
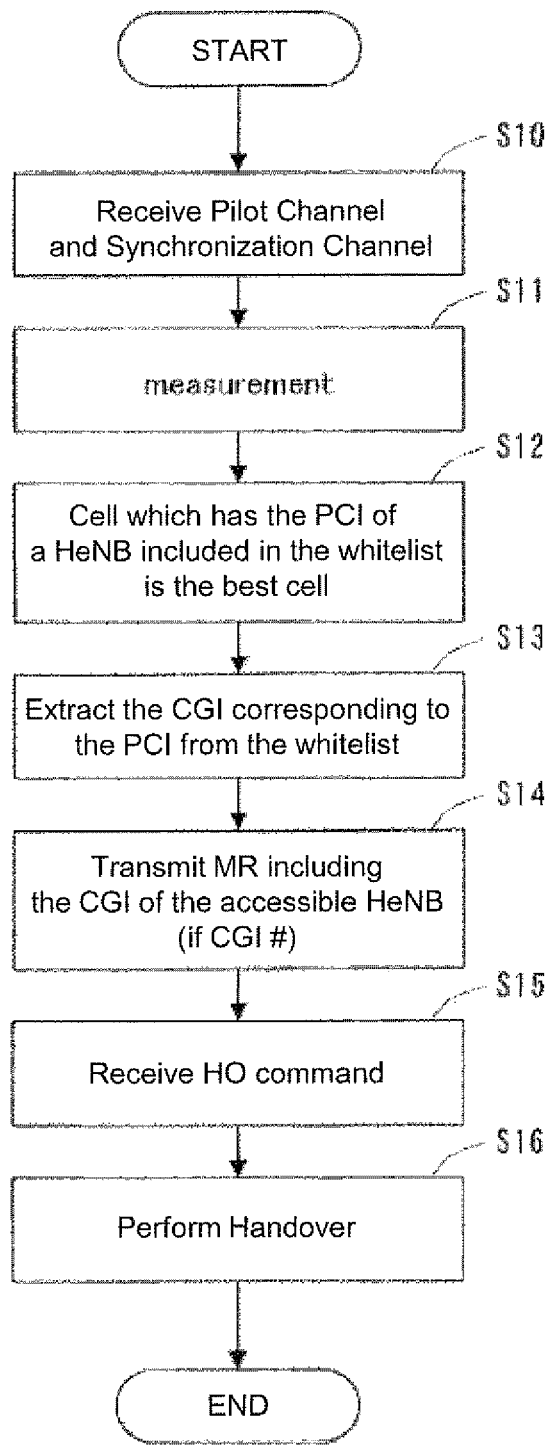
FIG. 5 is a flow chart for illustrating an operation of the terminal apparatus according to the first embodiment.

FIG. 5 is a flow chart showing the operation of the terminal apparatus 1 according to the embodiment. As shown in FIG. 5, the terminal apparatus 1 receives a pilot channel and a synchronization channel from the home eNB (S10), and takes reception quality measurements of the pilot channel of the home eNB (S11). The terminal apparatus 1 then determines whether or not the CSG cell of handover destination is accessible (i.e. whether or not it is the CSG cell that the terminal apparatus 1 desires to enter) based on the PCI acquired from the synchronization channel and the whitelist. In cases where a CSG cell that has the PCI of a home eNB included in the whitelist is the best cell that has the best reception quality (S12) for example, this determination is made by extracting the CGI of the CSG cell corresponding to the PCI from the whitelist (S13). The terminal apparatus 1 then creates a measurement report to which the CGI (if CGI) of the accessible CSG cell is added (S14), and transmits the measurement report to the base station apparatus 2 (macro eNB) (S15). Thereafter, once the terminal apparatus 1 receives an HO command from the base station apparatus 2 (macro eNB) (S16), a handover to the home eNB is performed (S17).

Figure 6:
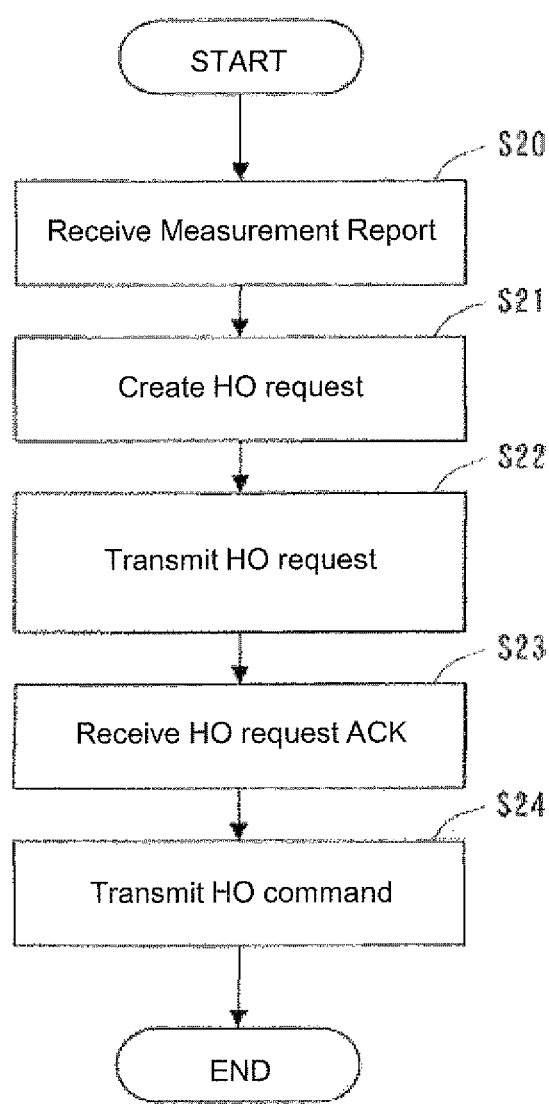
FIG. 6 is a flow chart for illustrating an operation of the base station apparatus according to the first embodiment.

FIG. 6 is a flow chart showing the operation of the base station apparatus 2 according to the embodiment. As shown in FIG. 6, upon receiving the measurement report of the reception quality measurement at the home eNB from the terminal apparatus 1 (S20), the base station apparatus 2 (macro eNB) creates an HO request for the home eNB of handover destination based on the "PCI" and "if CGI" added to the measurement report (S21) and transmits the HO request to the home eNB via the MME/GW (S22). Upon receiving a response (HO request ACK) to the HO request from the home eNB via the MME/GW (S23), the base station apparatus 2 (macro eNB) transmits an HO command for causing a transfer to the home eNB to the terminal apparatus 1 based on the HO request ACK (S24).

According to the wireless communication system according to the first embodiment, since the base station apparatus 2 (macro eNB) retrieves a home eNB whose CGI (if CGI) is desired by the terminal apparatus 1 from a list to transmit an HO request, it is possible to reduce wasteful signaling to two or more home eNBs that have the same PCI and reduce unnecessary resources being reserved in the home eNBs.

In other words, to cope with the problem of a prior art that the base station apparatus 2 (macro eNB) redundantly transmits HO requests even to other home eNBs that have the same PCI, the terminal apparatus 1 adds a CGI of a home eNB to which the terminal apparatus 1 desires to handover to a measurement report and transmits the report to the base station apparatus 2 (macro eNB) in the embodiment, so that the HO request is sent to only an appropriate home eNB.

(Second Embodiment)

A wireless communication system according to a second embodiment of the present invention will now be described below with reference to FIGS. 7 to 10. In this unit, description will primarily be made to differences from the first embodiment. Therefore, the configuration and operation of the second embodiment are similar to those of the first embodiment unless otherwise noted.

In this embodiment, it is assumed that a network policy of the base station apparatus 2 (macro eNB) does not support a reliable handover and is of aggressive one that performs a handover regardless of the presence or absence of an access permission. In other words, the embodiment is intended for a so-called aggressive base station apparatus 2 (macro eNB) of Release 8. The network policy of the base station apparatus 2 (macro eNB) is included in system information of the base station apparatus 2 (macro eNB), and conveyed to the entire macro cell through a Broadcast Control Channel, or BCCH. Alternatively, the network policy of the base station apparatus 2 (macro eNB) is included in a measurement control message, and conveyed to the terminal apparatus 1 individually through a Dedicated. Control Channel.

Figure 7:
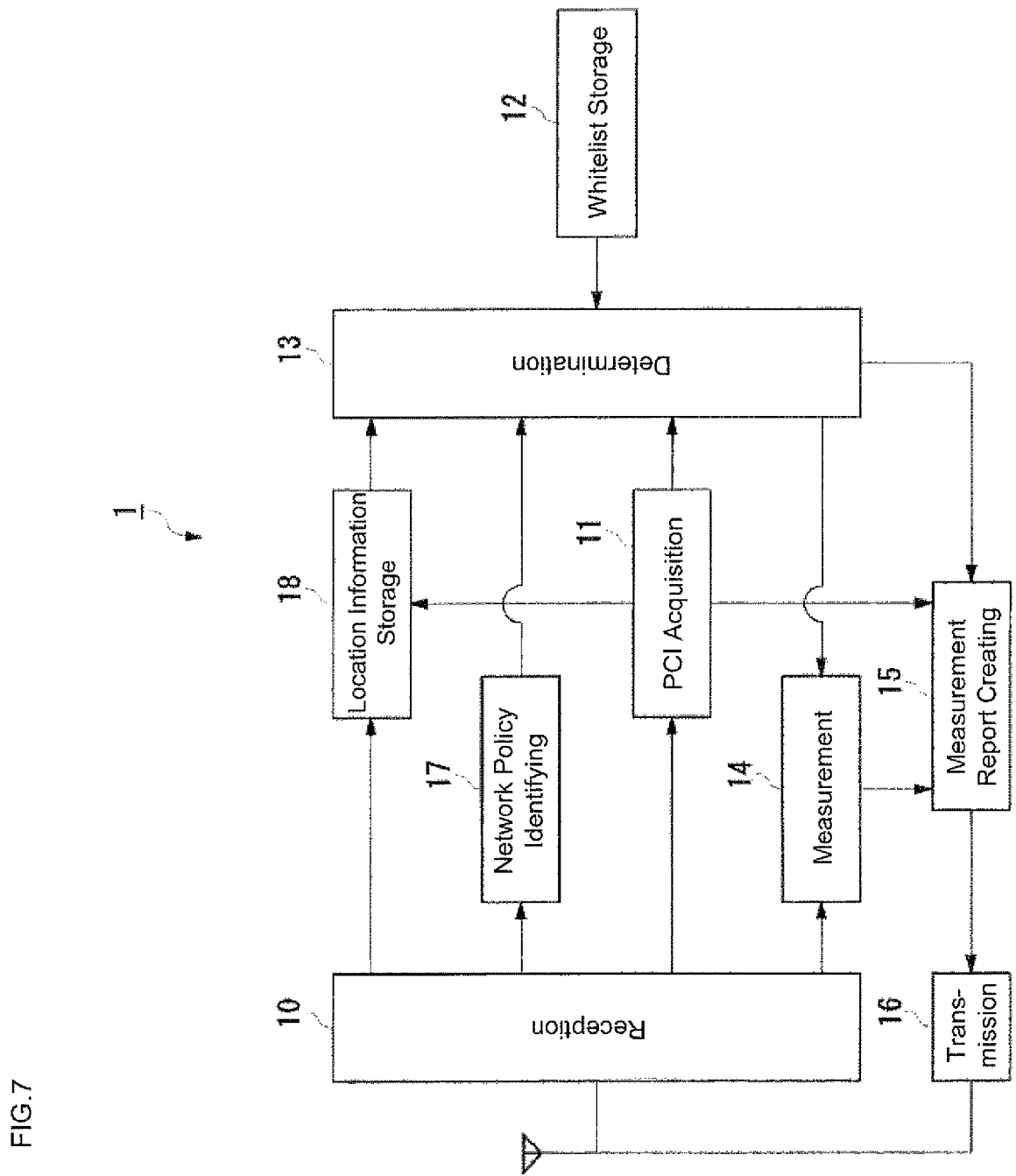
FIG. 7 is a block diagram showing a configuration of a terminal apparatus according to a second embodiment.

FIG. 7 is a block diagram showing a configuration of a terminal apparatus 1 according to the embodiment. In the terminal apparatus 1 according to the embodiment, a network policy identifying unit 17 and a location information storage unit 18 are added to the configuration according to the first embodiment.

Similarly to the first embodiment, the reception unit 10 receives a pilot channel as well as a synchronization channel from a home eNB, and receives an HO command from the base station apparatus 2 (macro eNB). The reception unit 10 also receives system information including a network policy from the base station apparatus 2 (macro eNB). The reception unit 10 has a GPS function that enables the reception unit 10 to receive the current location information of the terminal.

The network policy identifying unit 17 identifies the network policy (of aggressive one of Release 8) from the system information input from the reception unit 10, and outputs the result to the determination unit 13. The PCI acquisition unit 11, similarly to the first embodiment, acquires a PCI from the synchronization channel information, and outputs the acquired PCI to the determination unit 13, the measurement report creating unit 15, and the location information storage unit 18.

The location information storage unit 18 stores the location information (for example, the latitude and longitude information) of the terminal input from the reception unit 10, the PCI input from the PCI acquisition unit 11, and the like in association with each other as fingerprint information of a CSG cell that the terminal apparatus 1 has previously accessed. The information (fingerprint information) is output to the determination unit 13.

If it is determined that the base station apparatus 2 (macro eNB) is an aggressive macro eNB of Release 8 based on information output from the network policy identifying unit 17, the determination unit 13 determines whether the measured home eNB is that of an accessible CSG cell (i.e. a CSG cell that the terminal can access) based on the PCI input from the PCI acquisition unit 11 and the fingerprint information input from the location information storage unit 18.

For example, the determination unit 13 calculates the distance from the terminal apparatus 1 to the home eNB based on the PCI of the measured home eNB, the current location information of the terminal apparatus 1, and the fingerprint information (PCIs and the location information of CSG cells that the terminal apparatus 1 has previously accessed), and if the distance is at or less than a predetermined reference distance (for example, several tens to several hundreds meters), it is determined that the CSG cell is likely to be the one accessible to the terminal apparatus 1. On the other hand, if the distance is larger than the predetermined reference distance, the determination is that it is likely that the CSG cell is not the one accessible to the terminal apparatus 1.

As a result of the determination, if the measured home eNB is likely to be an accessible CSG cell (i.e. a CSG cell that the terminal apparatus 1 desires to enter), the determination unit 13 determines the CGI of the CSG cell accessible to the terminal apparatus 1, and outputs the CGI to the measurement report creating unit 15. On the other hand, if it is likely that the measured home eNB is not an accessible CSG cell (i.e. the CSG cell is not the one that the terminal apparatus 1 desires to enter) as a result of the determination, the determination unit 13 outputs, to the measurement report creating unit 15, an instruction to create a measurement report to which a flag (non CSG flag) is added indicating that the CSG cell is the one that the terminal apparatus 1 does not desire to enter. Alternatively, the determination unit 13 outputs an instruction to measure another frequency (for example, f2) of the macro cell (inter-frequency measurement) to the measurement unit 14.

Similarly to the first embodiment, the measurement unit 14 measures reception quality based on the pilot channel input from the reception unit 10, and outputs the result to the measurement report creating unit 15. The measurement unit 14 starts to measure another frequency (for example, f2) of the macro cell based on the inter-frequency measurement instruction input from the determination unit 13.

Figure 8:
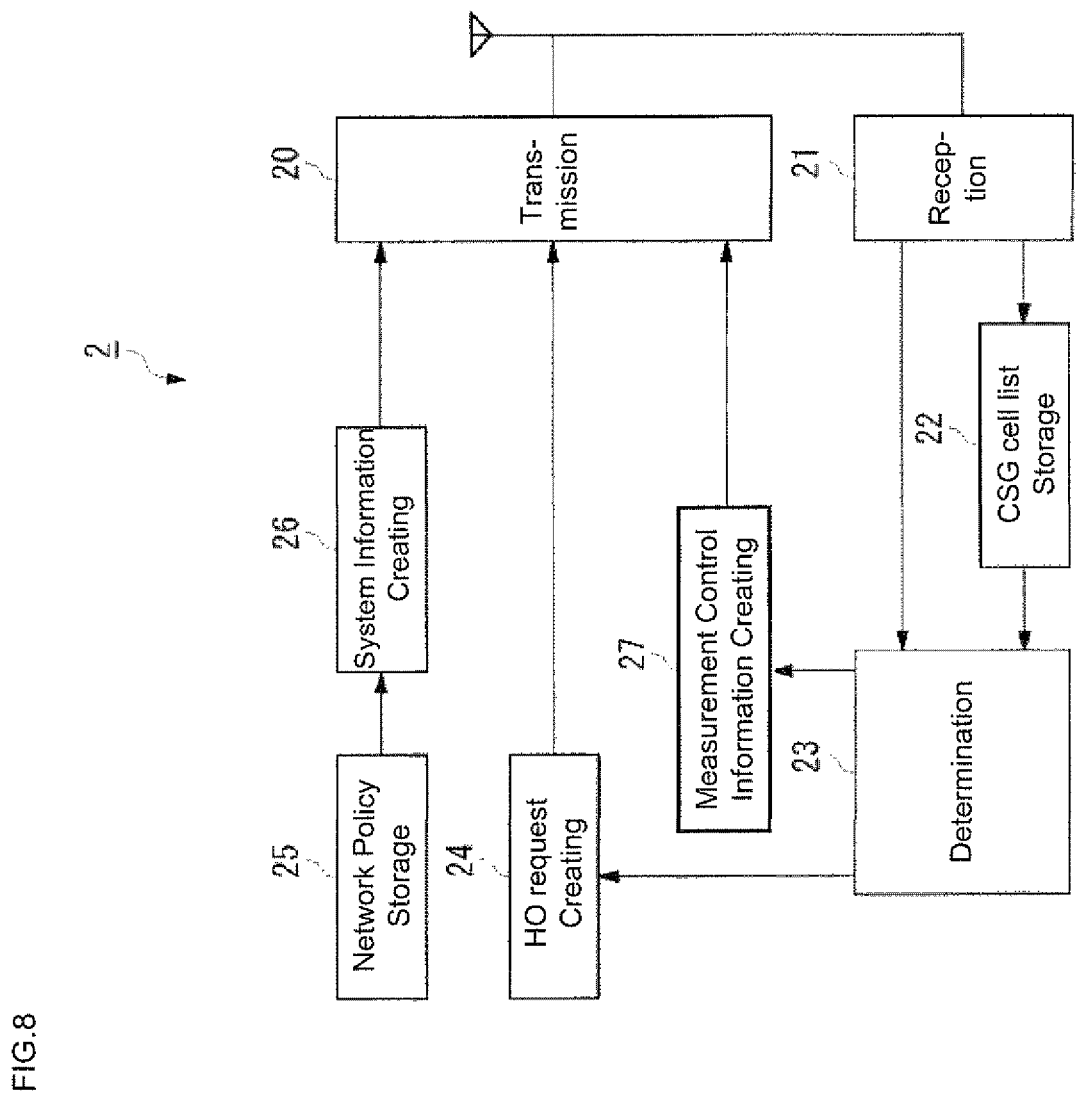
FIG. 8 is a block diagram showing a configuration of a base station apparatus according to the second embodiment.

FIG. 8 is a block diagram showing a configuration of a base station apparatus 2 according to the embodiment. In the base station apparatus 2 according to the embodiment, a network policy storage unit 25, a system information creating unit 26, and a measurement control information creating unit 27 are added to the configuration according to the first embodiment.

The network policy storage unit 25 stores the network policy (of aggressive one of Release 8) information of the base station apparatus 2 (macro eNB). The network policy information is input to the system information creating unit 26. The system information creating unit 26 creates system information including information output from the network policy storage unit 25. The created system information is input to the transmission unit 20.

Similarly to the first embodiment, the determination unit 23 compares the measurement report from the terminal apparatus 1 with the CSG cell list to extract a CSG cell corresponding to the PCI included in the measurement report from the terminal apparatus 1, and outputs an instruction to create an HO request for the corresponding CSG cell to the HO request creating unit 24. If the "non CSG flag" is included in the measurement report from the terminal apparatus 1, the determination unit 23 also inputs, to the measurement control information creating unit 27, an instruction to create a measurement control including an instruction to measure another frequency (for example, f2) of the macro cell (inter-frequency measurement).

The measurement control information creating unit 27 creates the measurement control including an instruction to measure another frequency (for example, f2) of the macro cell in response to the instruction from the determination unit 23. The created measurement control message is input to the transmission unit 20. The transmission unit 20 transmits the system information input from the system information creating unit 26, the HO request input from the HO request creating unit 24, the measurement control message input from the measurement control information creating unit 27, and the like to the terminal apparatus 1.

The operation of a thus configured wireless communication system will be described with reference to FIGS. 9 to 11.

Figure 9:
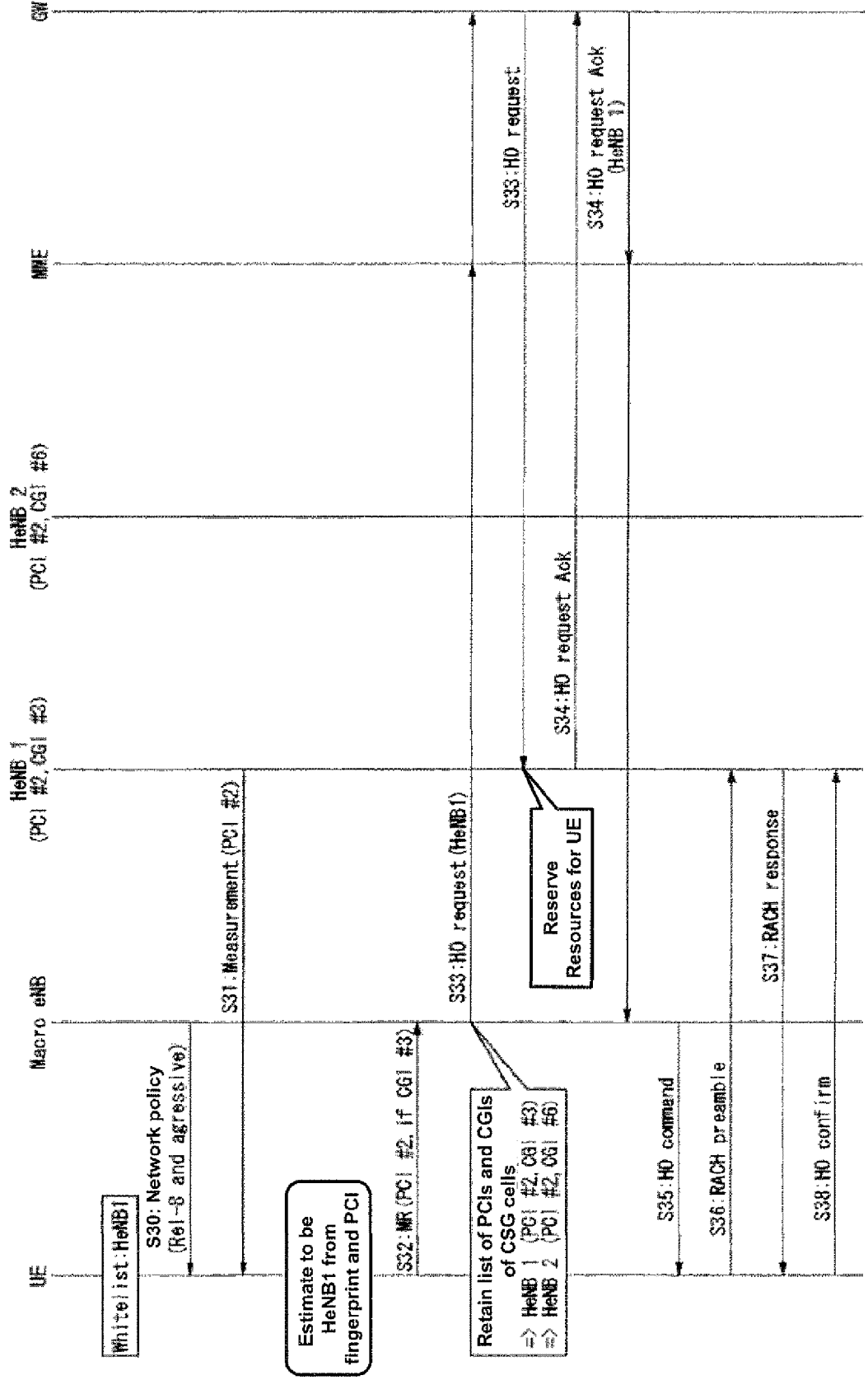
FIG. 9 is a sequence diagram for illustrating an operation of a wireless communication system according to the second embodiment.
Figure 10:
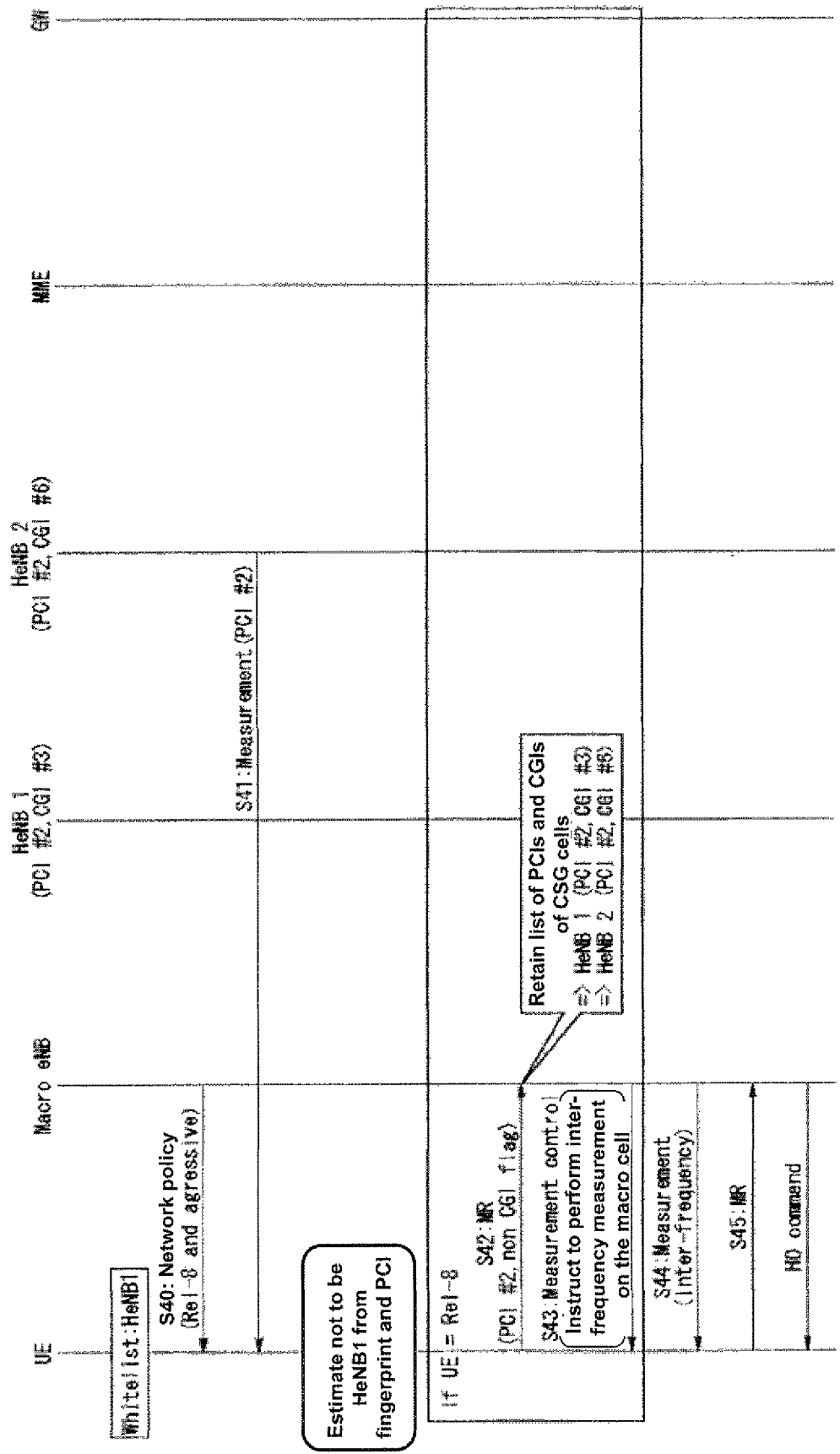
FIG. 10 is a sequence diagram for illustrating an operation of the wireless communication system according to the second embodiment.

FIGS. 9 and 10 are sequence diagrams showing the operation of the entire wireless communication system according to the embodiment. First, with reference to FIG. 9, description will be made to the operation in cases where it is determined that the measured home eNB is likely to be a home eNB accessible to the terminal apparatus 1 from the PCI and fingerprint information acquired by the terminal apparatus 1.

As shown in FIG. 9, the terminal apparatus 1 receives the system information (BCCH) from the base station apparatus 2 (macro eNB) and identifies the network policy of the base station apparatus 2 (macro eNB) (S30). In this case, the network policy of the base station apparatus 2 (macro eNB) is identified as an aggressive eNB of Release 8.

The terminal apparatus 1 takes reception quality measurements of the home eNB (home eNB 1) (S31), and acquires the PCI (here, PCI #2). The terminal apparatus 1 retains PCIs and the location information (fingerprint information) of CSG cells that the terminal apparatus 1 has previously camped on, and in this case, it is determined that the measured home eNB (home eNB 1) is likely to be a home eNB accessible to the terminal apparatus 1 from the PCI and fingerprint information acquired by the terminal apparatus 1.

The terminal apparatus 1 then adds the PCI of the home eNB (home eNB 1) subjected to the reception quality measurement and the CGI (here, CGI #3) of an accessible CSG cell corresponding to the PCI (the CSG cell that the terminal apparatus 1 desires to enter) to the reception quality measurement result, and notifies the base station apparatus 2 (macro eNB) of a resultant measurement report MR (PCI #2, if CGI #3) (S32).

The base station apparatus 2 (macro eNB) determines a home eNB that has the "PCI" and "if CGI" notified from the terminal apparatus 1 (here, the home eNB 1), and transmits an HO request to the home eNB 1 through the MME/GW (S33). If the handover of the terminal apparatus 1 is to be permitted, the home eNB 1 that has received the HO request reserves in advance wireless resources appropriate for services provided to the terminal apparatus 1, performs acceptance control, and transmits an ACK to the HO request via the MME/GW to the base station apparatus 2 (macro eNB) (S34).

Upon receiving the ACK to the HO request from the home eNB 1, the base station apparatus 2 (macro eNB) transmits an HO command for instructing the terminal apparatus 1 to transfer to the CSG cell 1 (S35), and the terminal apparatus 1 transmits a random access preamble to the specified home eNB (S36). After the home eNB transmits a random access response (S37) and synchronization is established, the terminal apparatus 1 transmits an HO confirmation to the home eNB 1 (S38).

Next, with reference to FIG. 10, description will be made to the operation in cases where the determination is that it is likely that the measured home eNB is not a home eNB accessible to the terminal apparatus 1 from the PCI and fingerprint information acquired by the terminal apparatus 1.

As shown in FIG. 10, the terminal apparatus 1 receives the system information (BCCH) from the base station apparatus 2 (macro eNB) and identifies the network policy of the base station apparatus 2 (macro eNB) (S40). In this case, the base station apparatus 2 (macro eNB) is also identified as an aggressive eNB of Release 8.

The terminal apparatus 1 takes reception quality measurements of the home eNB (home eNB 1) (S41), and acquires the PCI (here, PCI #2). The terminal apparatus 1 retains PCIs and the location information (fingerprint information) of CSG cells that the terminal apparatus 1 has previously camped on, and in this case, the determination is that it is likely that the measured home eNB (home eNB 2) is not a home eNB accessible to the terminal apparatus 1 from the PCI and fingerprint information acquired by the terminal apparatus 1.

For example, if the terminal apparatus 1 does not have a high level of self-decision function (for example, the terminal apparatus 1 is a Release 8 terminal), the terminal apparatus 1 adds the PCI of the home eNB (home eNB 2) subjected to the reception quality measurement and a flag "non CSG flag" for notifying that the CSG cell corresponding to the PC1 is not an accessible CSG cell (i.e. the CSG cell is not the one that the terminal apparatus 1 desires to enter) to the reception quality measurement result, and notifies the base station apparatus 2 (macro eNB) of a resultant measurement report MR (PCI #2, non CSG flag) (S42).

Upon receiving the measurement report to which the "non CSG flag" is added, the base station apparatus 2 (macro eNB) transmits a measurement control message for instructing the terminal apparatus 1 to measure another frequency (for example, f2) of the macro cell (inter-frequency measurement) (S43). Upon receiving the measurement control message from the base station apparatus 2 (macro eNB), the terminal apparatus 1 starts to measure another frequency (for example, f2) of the macro cell (S44), and transmits a measurement report to the base station apparatus 2 (macro eNB) (S45).

If the terminal apparatus 1 has a high level of self-decision function (the terminal apparatus 1 is a Release 9 terminal), the terminal apparatus 1 automatically starts to measure another frequency (for example, f2) of the macro cell (inter-frequency measurement) (S44) at the time when the terminal apparatus 1 estimates that the measured CSG cell is not an accessible CSG cell, and transmits a measurement report to the base station apparatus 2 (macro eNB) (S45).

Figure 11:
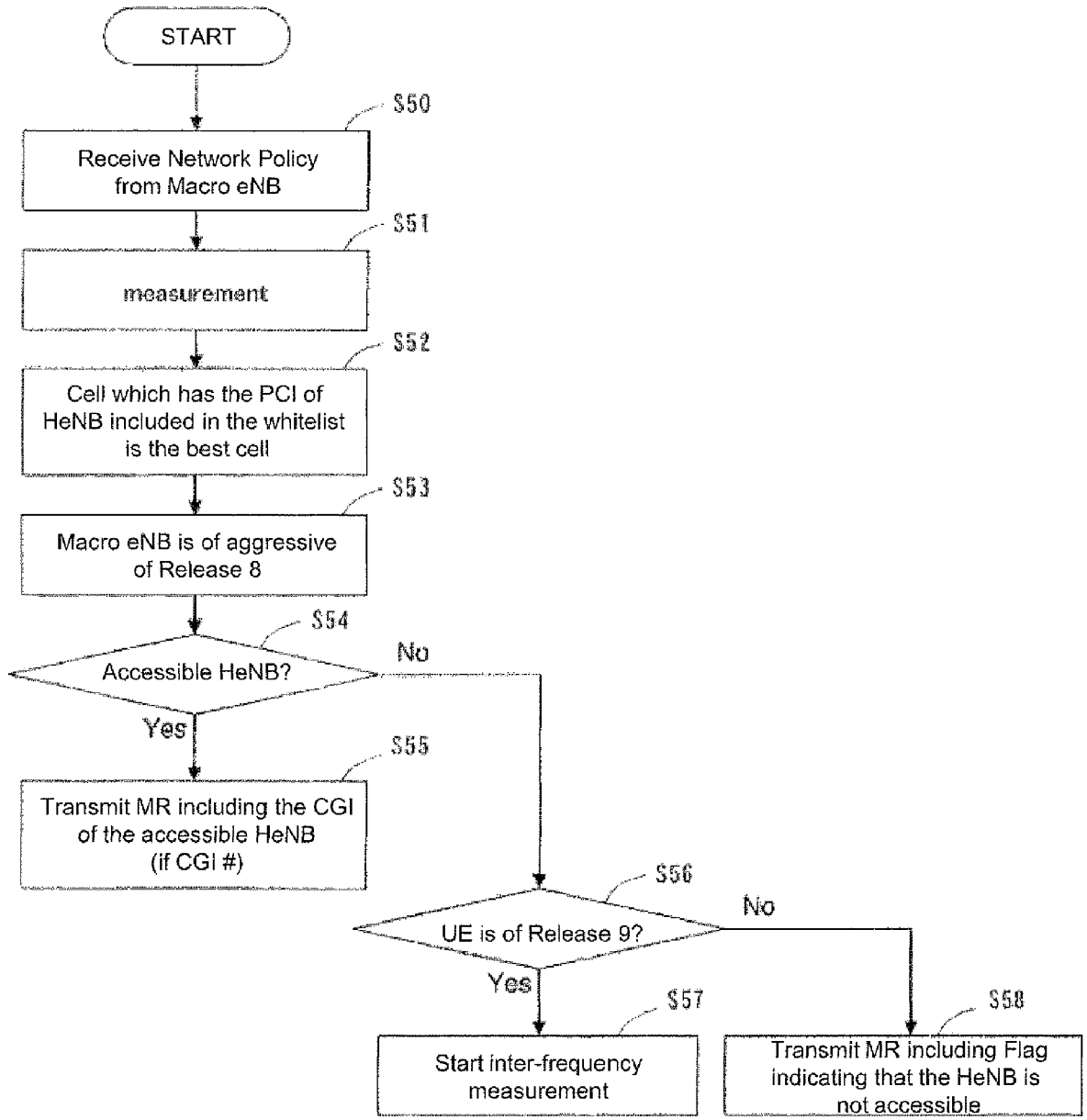
FIG. 11 is a flow chart for illustrating an operation of the terminal apparatus according to the second embodiment.

FIG. 11 is a flow chart showing the operation of the terminal apparatus 1 according to the embodiment. As shown in FIG. 11, the terminal apparatus 1 first receives a network policy included in system information from the base station apparatus 2 (macro eNB) (S50). Next, the terminal apparatus 1 takes reception quality measurements of a pilot channel of a home eNB (S51), and if a CSG cell that has the PCI of a home eNB contained in the whitelist is the best cell of the best reception qualify (S52), determination is made on the network policy.

If it is determined that the base station apparatus 2 (macro eNB) is an aggressive macro eNB of Release 8 (S53) as a result of the determination on the network policy, the terminal apparatus 1 uses the acquired PCI and fingerprint information to determine whether the home eNB is accessible to the terminal apparatus 1 (S54). If it is determined that the CSG cell is likely to be the one accessible to the terminal apparatus 1, the terminal apparatus 1 creates a measurement report including the CGI (if CGI) of the accessible CSG cell, and transmits the measurement report to the base station apparatus 2 (macro eNB) (S55).

If the determination is that it is likely that the CSG cell is not the one accessible to the terminal apparatus 1 and if the terminal apparatus 1 has a high level of self-decision function (for example, the terminal apparatus 1 is a Release 9 terminal) (S56), the terminal apparatus 1 starts to take reception quality measurements of another frequency of the base station apparatus 2 (macro eNB) (inter-frequency measurement) without transmitting a measurement report (S57).

On the other hand, if the terminal apparatus 1 does not have a high level of self-decision function (for example, the terminal apparatus 1 is a Release 8 terminal), the terminal apparatus 1 creates a measurement report including a flag for notifying that the CSG cell is not an accessible CSG cell, and transmits the measurement report to the base station apparatus 2 (macro eNB) (S58).

According to the wireless communication system according to the second embodiment, similar effects to the first embodiment can be achieved.

The embodiment is intended for an aggressive base station apparatus 2 (macro eNB) of Release 8. In this case, when the terminal sends a CGI (if CGI) of an accessible CSG cell with a measurement report, it is conceivable that a handover instruction may be provided regardless of whether the CSG cell is actually the one accessible to the terminal apparatus 1. In other words, in the case of an aggressive macro eNB of Release 8, it is conceivable that the terminal apparatus 1 starts HO procedures for home eNBs that are not listed in the whitelist, causing a problem of wasteful signaling. Also similarly to the first embodiment, sending only a PCI in a measurement report may cause a problem of HO requests being sent to more than one home eNB.

In this embodiment, therefore, in view of the fact that the base station apparatus 2 (macro eNB) acts in a different way according to the network policy when a measurement report is received, it is possible to suppress wasteful signaling and an increase of message size of a measurement report by determining information to be sent in the measurement report depending on the network policy of the base station apparatus 2 (macro eNB).

In particular, according to the wireless communication system according to the embodiment, if the base station apparatus 2 (macro eNB) is an aggressive macro eNB of Release 8, the terminal apparatus 1 uses location information by means of fingerprints to confirm confidence before the terminal apparatus 1 sends "if CGI" in a measurement report. It is therefore possible to reduce wasteful signaling such as handover instructions provided to CSG cells that are not listed in the whitelist. In this way, signaling overhead can be reduced by considering actions taken by the base station apparatus 2 (macro eNB) at the time when a reception quality measurement result is received from the terminal apparatus 1 and transmitting a suitable reception quality measurement result depending on the network policy of the base station apparatus 2 (macro eNB).

(Third Embodiment)

A wireless communication system according to a third embodiment of the present invention will now be described below with reference to FIGS. 12 to 15. In this unit, description will primarily be made to differences from the second embodiment. Therefore, the configuration and operation of the third embodiment are similar to those of the second embodiment unless otherwise noted.

In this embodiment, it is assumed that a network policy of the base station apparatus 2 (macro eNB) does not support a reliable handover and is of non-aggressive that does not perform a handover regardless of the presence or absence of an access permission. In other words, the embodiment is intended for a so-called non-aggressive macro eNB of Release 8.

Figure 12:
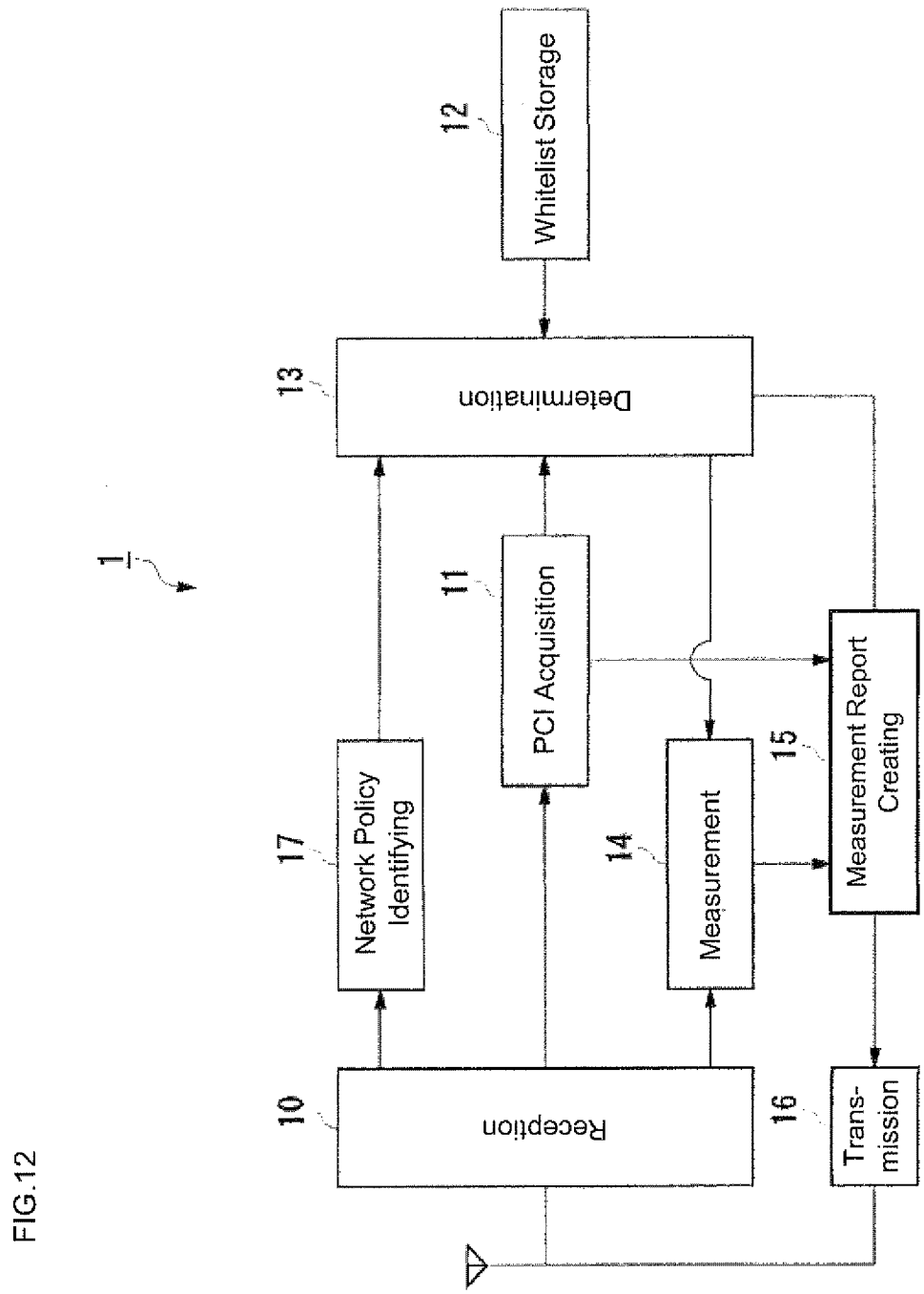
FIG. 12 is a block diagram showing a configuration of a terminal apparatus according to a third embodiment.

FIG. 12 is a block diagram showing a configuration of a terminal apparatus 1 according to the embodiment. The terminal apparatus 1 according to the embodiment is not provided with a location information storage unit 18. Further in this embodiment, if it is determined that the base station apparatus 2 (macro eNB) is a non-aggressive macro eNB of Release 8 based on information output from the network policy identifying unit 17, the determination unit 13 outputs, to the measurement report creating unit 15, an instruction to create a measurement report to which a CGI of a measured CSG cell is not added (i.e. a measurement report including a PCI and a reception quality measurement result of the measured CSG cell). Incidentally, the process is performed in cases where the terminal apparatus 1 does not have a high level of self-decision function (for example, the terminal apparatus 1 is a Release 8 terminal). If the terminal apparatus 1 has a high level of self-decision function (for example, the terminal apparatus 1 is a Release 9 terminal), the determination unit 13 outputs an instruction to measure another frequency (for example, f2) of the macro cell (inter-frequency measurement) to the measurement unit 14.

Figure 13:
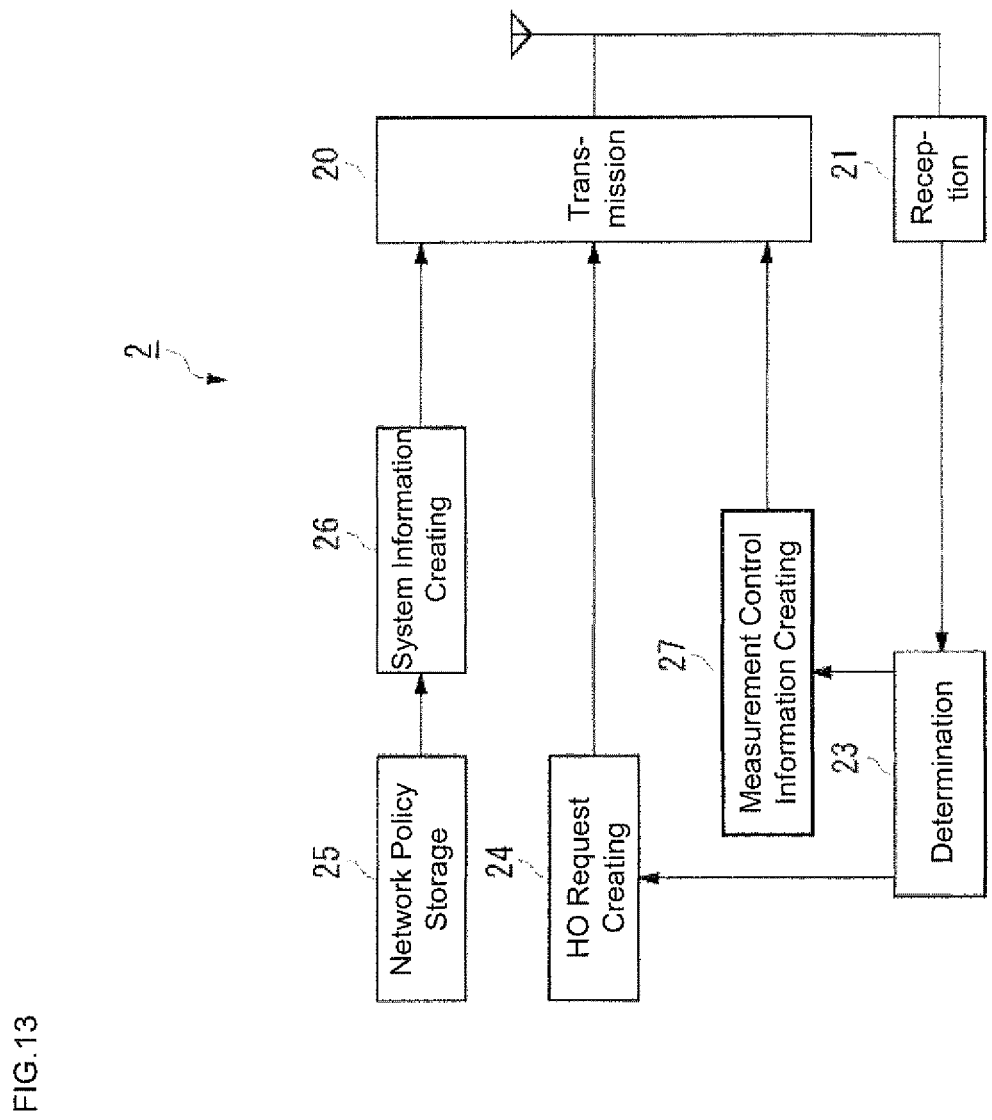
FIG. 13 is a block diagram showing a configuration of a base station apparatus according to the third embodiment.

FIG. 13 is a block diagram showing a configuration of a base station apparatus 2 according to the embodiment. The base station apparatus 2, according to the embodiment is not provided with a CSG cell list storage unit 22. Further in this embodiment, the network policy storage unit 25 stores a network policy (of non-aggressive of Release 8) information of the base station apparatus 2 (macro eNB). When it is determined that the measured cell is not a macro cell (it is a CSG cell) from a PCI included in a measurement report from the terminal apparatus 1, the determination unit 23 inputs, to the measurement control information creating unit 27, an instruction to create a measurement control message including an instruction to measure another frequency (for example, f2) of the macro cell (inter-frequency measurement).

The operation of a thus configured wireless communication system will be described with reference to FIGS. 14 and 15.

Figure 14:
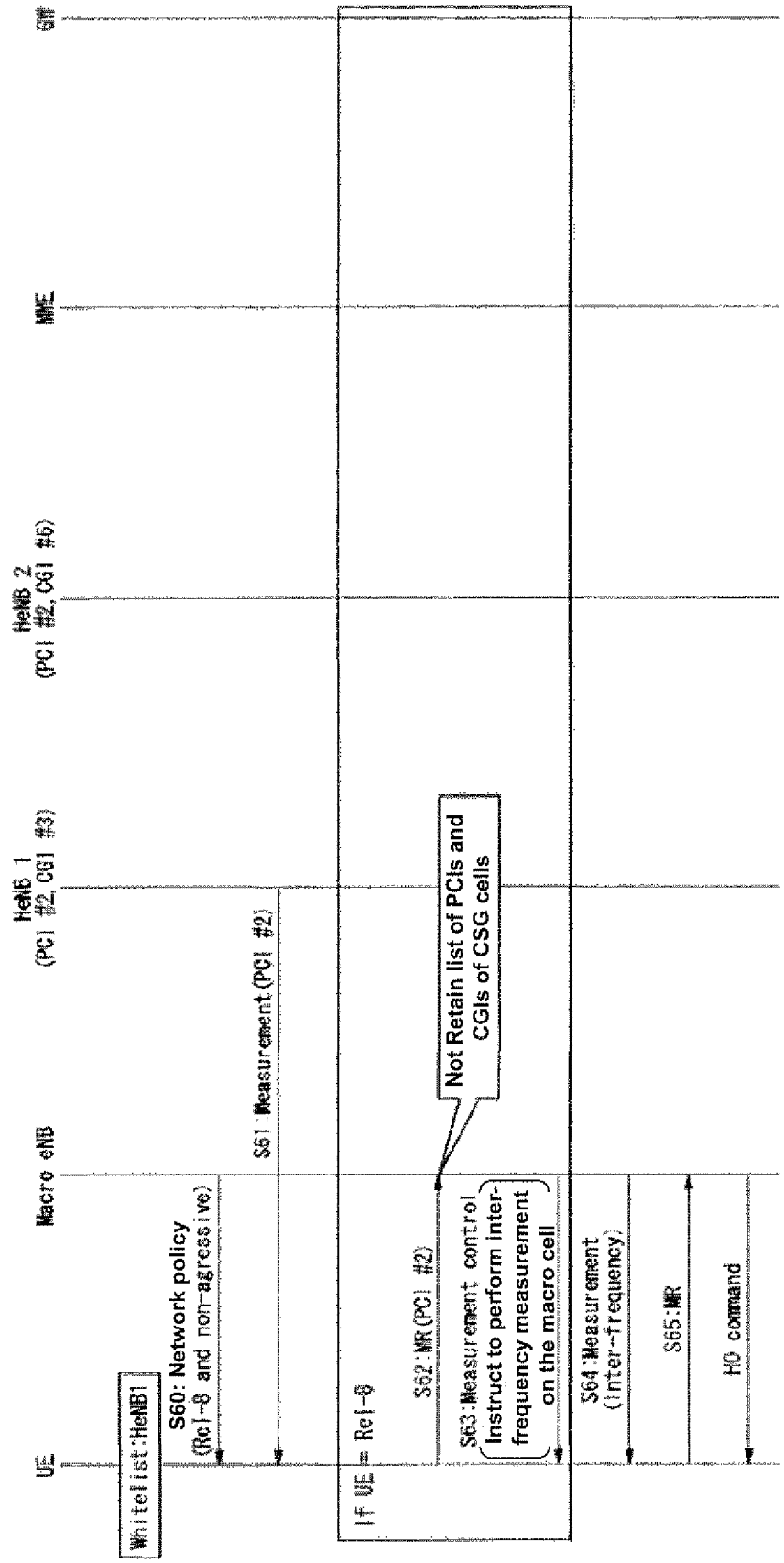
FIG. 14 is a sequence diagram for illustrating an operation of a wireless communication system according to the third embodiment.

FIG. 14 is a sequence diagram showing the operation of the entire wireless communication system according to the embodiment. As shown in FIG. 14, the terminal apparatus 1 receives system information (BCCH) from the base station apparatus 2 (macro eNB) and identifies a network policy of the base station apparatus 2 (macro eNB) (S60). In this case, the network policy of the base station apparatus 2 (macro eNB) is identified as a non-aggressive eNB of Release 8.

The terminal apparatus 1 takes reception quality measurements of the home eNB (home eNB 1) (S61), and acquires the PCI (here, PCI #2). At this time, it is possible to determine that the measured cell is a CSG cell from the acquired PCI and a whitelist retained by the terminal apparatus 1. It is also possible to determine that the base station apparatus 2 (macro eNB) does not retain a list of CSG cells from the network policy of the base station apparatus 2 (macro eNB).

For example, if the terminal apparatus 1 does not have a high level of self-decision function (for example, the terminal apparatus 1 is a Release 8 terminal), the terminal apparatus 1 notifies the base station apparatus 2 (macro eNB) of only a reception quality measurement result to which the PCI of the home eNB 1 subjected to the reception quality measurement is added (S62). In other words, a CGI of the measured home eNB 1 is not notified to the base station apparatus 2 (macro eNB). Upon receiving a measurement report from the terminal apparatus 1, the base station apparatus 2 (macro eNB) transmits a measurement control message for instructing the terminal apparatus 1 to measure another frequency (for example, f2) of the macro cell (inter-frequency measurement) (S63). Upon receiving the measurement control message from the base station apparatus 2 (macro eNB), the terminal apparatus 1 starts to measure another frequency (for example, f2) of the macro cell (S64), and transmits a measurement report to the base station apparatus 2 (macro eNB) (S65).

If the terminal apparatus 1 has a high level of self-decision function (the terminal apparatus 1 is a Release 9 terminal), the terminal apparatus 1 automatically starts to measure another frequency (for example, f2) of the macro cell (inter-frequency measurement) (S64) at the time when it is determined that the measured cell is a CSG cell and the base station apparatus 2 (macro eNB) is a non-aggressive macro eNB of Release 8, and transmits a measurement report to the base station apparatus 2 (macro eNB) (S65).

Figure 15:
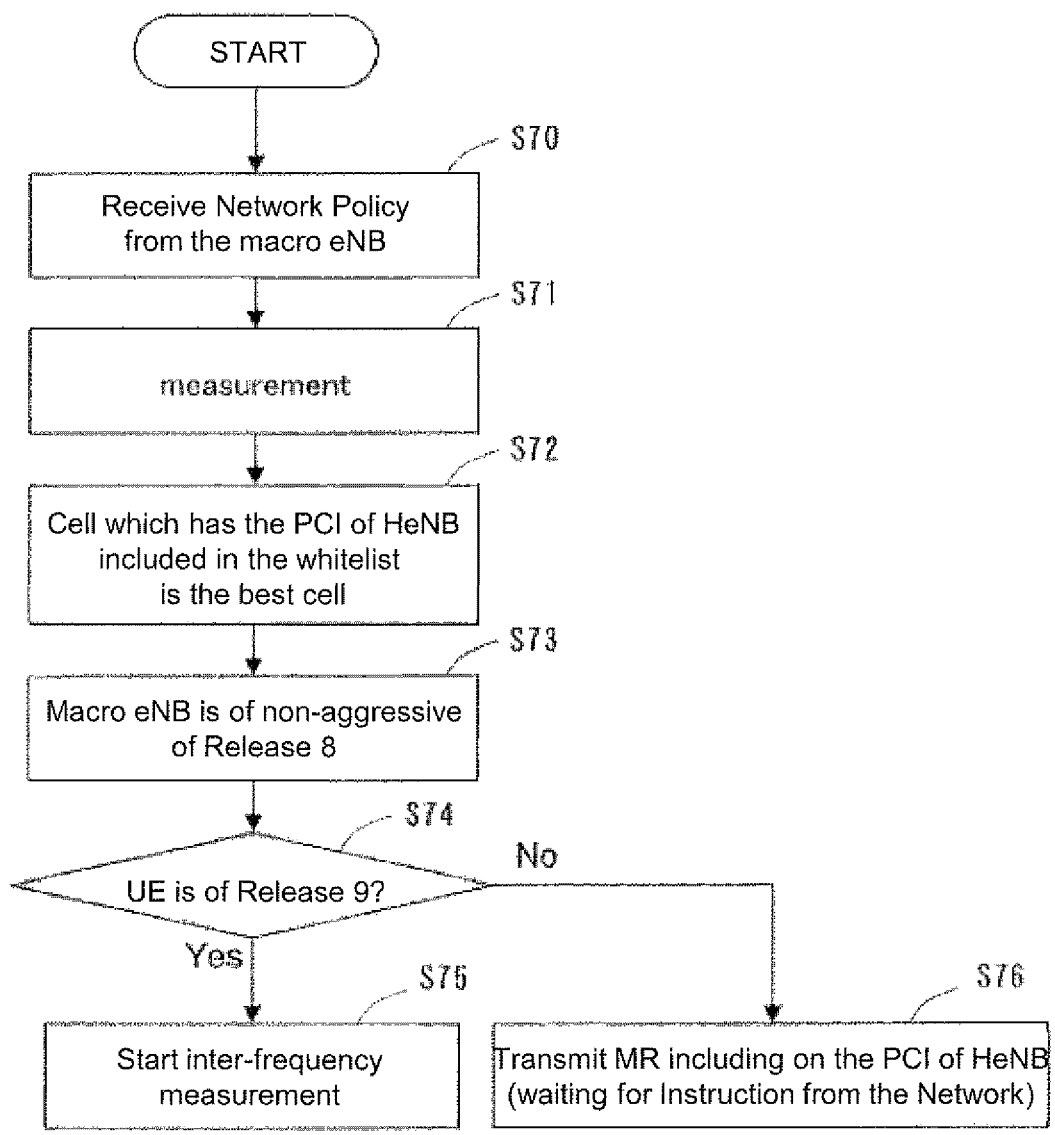
FIG. 15 is a flow chart for illustrating an operation of the terminal apparatus according to the third embodiment.

FIG. 15 is a flow chart showing the operation of the terminal apparatus 1 according to the embodiment. As shown in FIG. 15, the terminal apparatus 1 first receives a network policy included in system information from the base station apparatus 2 (macro eNB) (S70). Next, the terminal apparatus 1 takes reception quality measurements of a pilot channel of a home eNB (S71), and if a CSG cell that has the PCI of a home eNB contained in the whitelist is the best cell of the best reception qualify (S72), determination on the network policy is made.

If it is determined that the base station apparatus 2 (macro eNB) is a non-aggressive macro eNB of Release 8 (S73) as a result of the examination on the network policy, and if the terminal apparatus 1 has a high level of self-decision function (for example, the terminal apparatus 1 is a Release 9 terminal) (S74), the terminal apparatus 1 starts to take reception quality measurements of another frequency of the base station apparatus 2 (macro eNB) (inter-frequency measurement) without transmitting a measurement report (S75).

On the other hand, if the terminal apparatus 1 does not have a high level of self-decision function (for example, the terminal apparatus 1 is a Release 8 terminal), the terminal apparatus 1 creates a measurement report to which only the PCI of the CSG cell is added (i.e. a measurement report to which a CGI of the CSG cell is not added), and transmits the measurement report to the base station apparatus 2 (macro eNB) (S76).

According to the wireless communication system according to the third embodiment, similar effects to the first embodiment can be achieved.

The embodiment is intended for a non-aggressive macro eNB of Release 8. In this case, the base station apparatus 2 (macro eNB) does not completely support a handover for CSG cells and it is conceivable that the base station apparatus 2 (macro eNB) does not retain a list of home eNBs contained in the macro cell. In this case, even when the terminal apparatus 1 sends a CGI (if CGI) of an accessible CSG cell with a measurement report, the base station apparatus 2 (macro eNB) cannot take an action because of the lack of the list of CSG cells, causing a problem of an increase of message size of a measurement report due to unnecessary information.

In this embodiment, therefore, it is possible to minimize a message size by sending only a PCI of a home eNB acquired during measurement.

In particular, according to the wireless communication system according to the embodiment, if the base station apparatus 2 (macro eNB) is a non-aggressive macro eNB of Release 8, the terminal apparatus 1 sends only a PCI of a home eNB acquired during measurement, so that the message size can be minimized.

Incidentally, the base station apparatus 2 (macro eNB) may retain a CSG cell list received from the MME/GW. In this case, if two or more CSG cells that have the same PCI are present in the CSG cell list, the base station apparatus 2 (macro eNB) may perform similar operations. If the same PC1 (a certain PC1) is held by only one CSG cell in the CSG cell list, an HO request may be transmitted to the corresponding home eNB.

(Fourth Embodiment)

A wireless communication system according to a fourth embodiment of the present invention will now be described below with reference to FIGS. 16 to 19. In this unit, description will primarily be made to differences from the second embodiment. Therefore, the configuration and operation of the fourth embodiment are similar to those of the second embodiment unless otherwise noted.

In this embodiment, it is assumed that a network policy of the base station apparatus 2 (macro eNB) supports a reliable handover. In other words, the embodiment is intended for a so-called Release 9 macro eNB.

Figure 16:
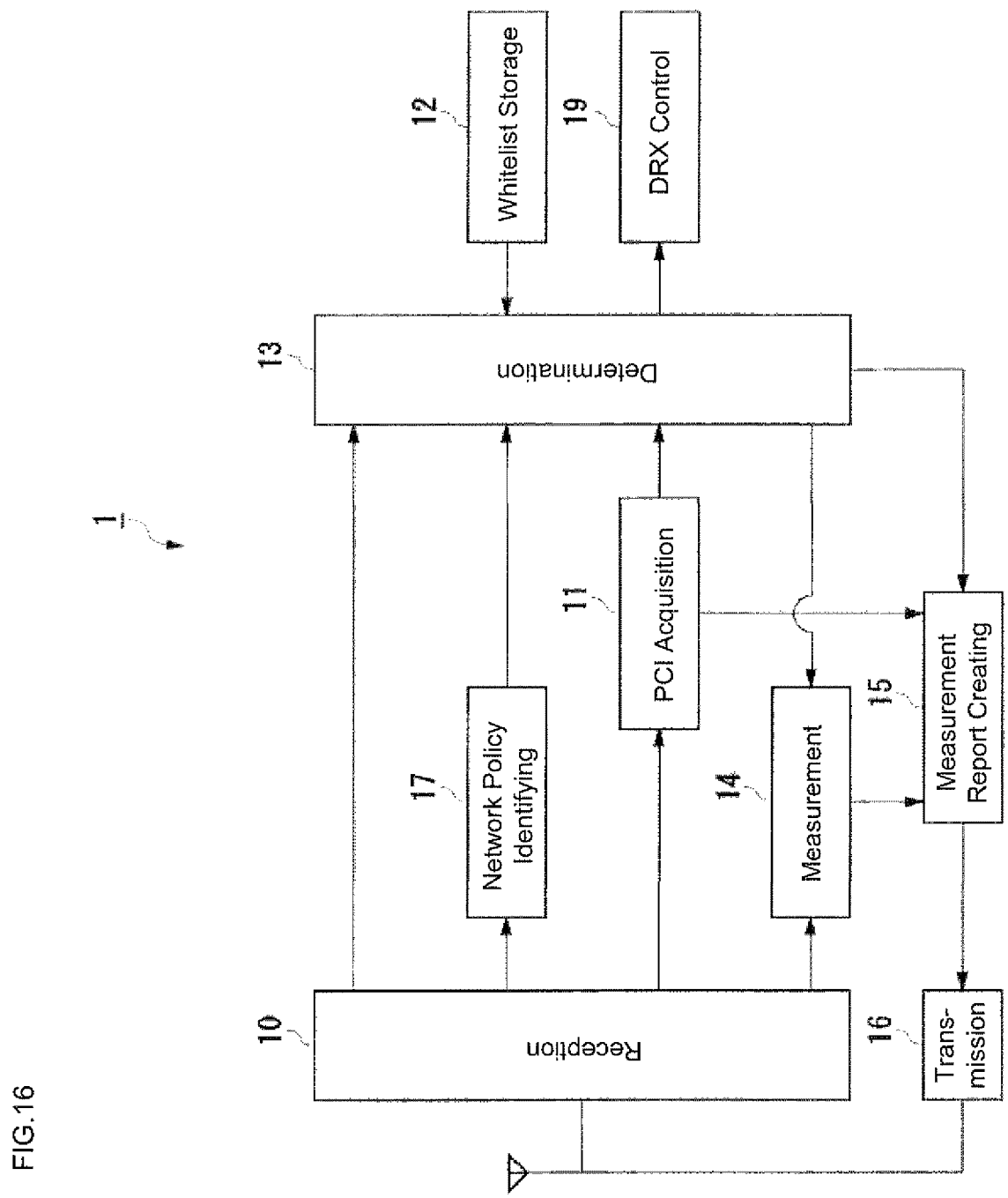
FIG. 16 is a block diagram showing a configuration of a terminal apparatus according to a fourth embodiment.

FIG. 16 is a block diagram showing a configuration of a terminal apparatus 1 according to the embodiment. The terminal apparatus 1 according to the embodiment is not provided with a location information storage unit 18 and a DRX control unit 19 is added. Discontinuous reception (DRX) is a control method of the terminal apparatus 1 to receive data intermittently when the receiving data is discontinuous in order to suppress receiving power consumption. The DRX includes long DRX and short DRX, whose period of time during which data is not received is different from each other. The long DRX is used in cases where data is not received for a long period, since the longer the period during which data is not received is, the more the power consumption of the terminal apparatus 1 is suppressed. The terminal apparatus 1 is instructed to implement the DRX and to use either of the long DRX or the short DRX when the terminal apparatus 1 establishes a connection with the base station apparatus 2. The terminal apparatus 1 does not implement the DRX without an instruction from the base station apparatus 2. Further in this embodiment, if it is determined that the base station apparatus 2 (macro eNB) is a macro eNB of Release 9 based on information output from the network policy identifying unit 17, the determination unit 13 inputs, to the measurement unit 14, an instruction to receive BCCH of a CSG cell to acquire a CGI while the terminal implements the long DRX. On the other hand, if the terminal does not implement the long DRX, the determination unit 13 outputs, to the measurement report creating unit 15, an instruction to create a measurement report including a PCI and a reception quality measurement result of the measured CSG cell. Based on an instruction in a measurement control message output from the reception unit 10, the determination unit 13 inputs an instruction to implement the long DRX to the DRX control unit 19 or outputs an instruction to measure another frequency (for example, f2) of the macro cell (inter-frequency measurement) to the measurement unit 14. The DRX control unit 19 starts to implement the long DRX according to the output from the determination unit 13.

Figure 17:
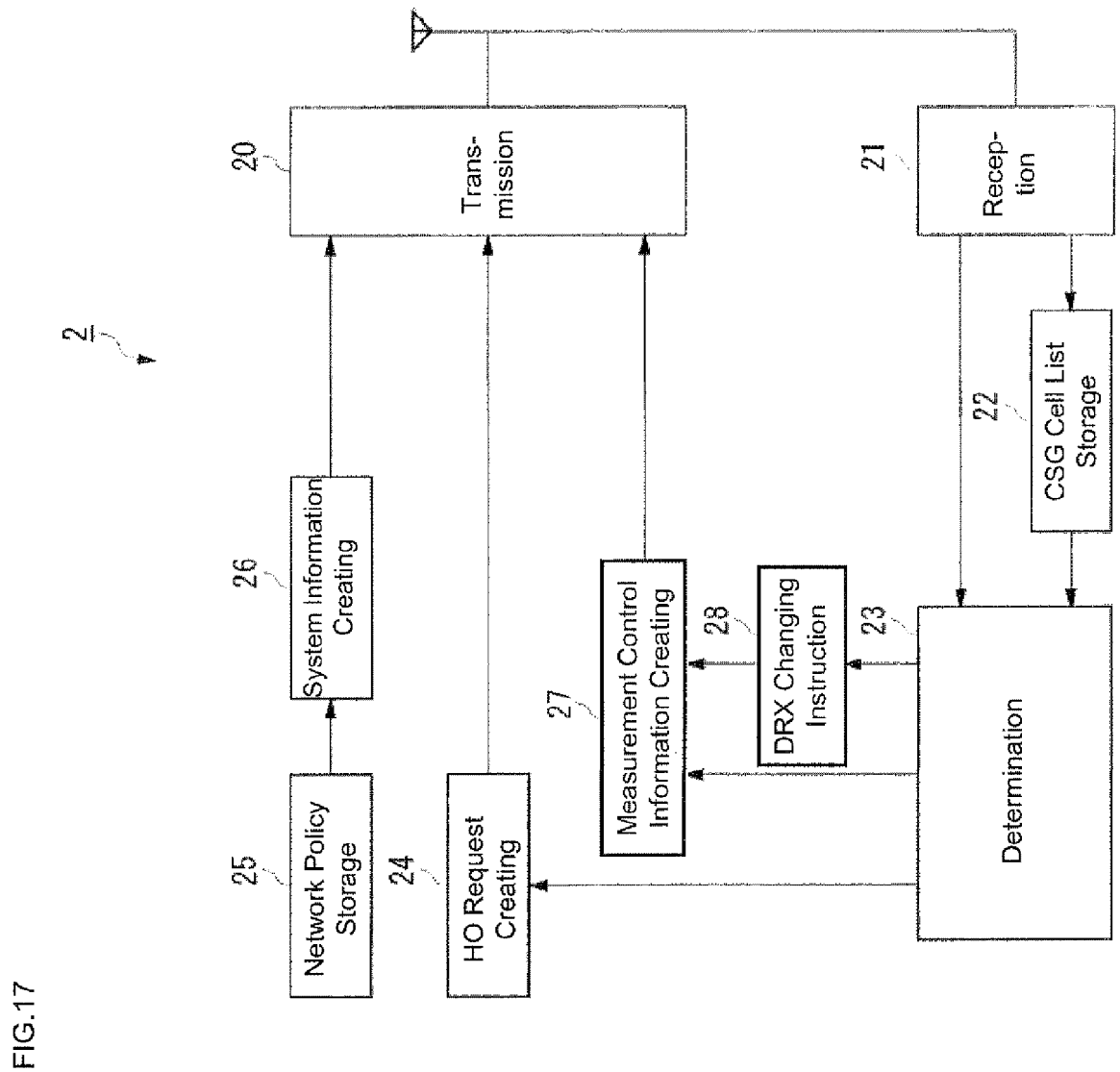
FIG. 17 is a block diagram showing a configuration of a base station apparatus according to the fourth embodiment.

FIG. 17 is a block diagram showing a configuration of a base station apparatus 2 according to the embodiment. A DRX changing instruction unit 28 is added to the base station apparatus 2 according to the embodiment. Further in this embodiment, the network policy storage unit 25 stores a network policy (Release 9) information of the base station apparatus 2 (macro eNB). If a PCI and a CGI are added to a measurement report output from the reception unit 21, which has been sent from the terminal apparatus 1, the determination unit 23 compares it with a CSG cell list output from the CSG cell list storage unit 22 to extract a CSG cell corresponding to a combination of the PCI and the CGI included in the measurement report from the terminal apparatus 1, and outputs an instruction to create an HO request for the corresponding CSG cell to the HO request creating unit 24. If a CGI is not added to a measurement report from the terminal apparatus 1, the determination unit 23 inputs, to the DRX changing instruction unit 28, an instruction for the terminal apparatus 1 to implement the long DRX, or inputs, to the measurement control information creating unit 27, an instruction to create a measurement control message including an instruction to measure another frequency (for example, f2) of the macro cell (inter-frequency measurement).

In response to the instruction from the determination unit 23, the DRX changing instruction unit 28 inputs, to the measurement control information creating unit 27, an instruction to create a measurement control message including an instruction to implement the long DRX. In response to the instruction from the determination unit 23, the measurement control information creating unit 27 creates a measurement control message including an instruction to measure another frequency (for example, f2) of the macro cell, and inputs it to the transmission unit 20. In response to the instruction from both the determination unit 23 and the DRX changing instruction unit 28, the measurement control information creating unit 27 creates a measurement control message including an instruction to implement the long DRX, and inputs it to the transmission unit 20.

The operation of a thus configured wireless communication system will be described with reference to FIGS. 18 and 19.

Figure 18:
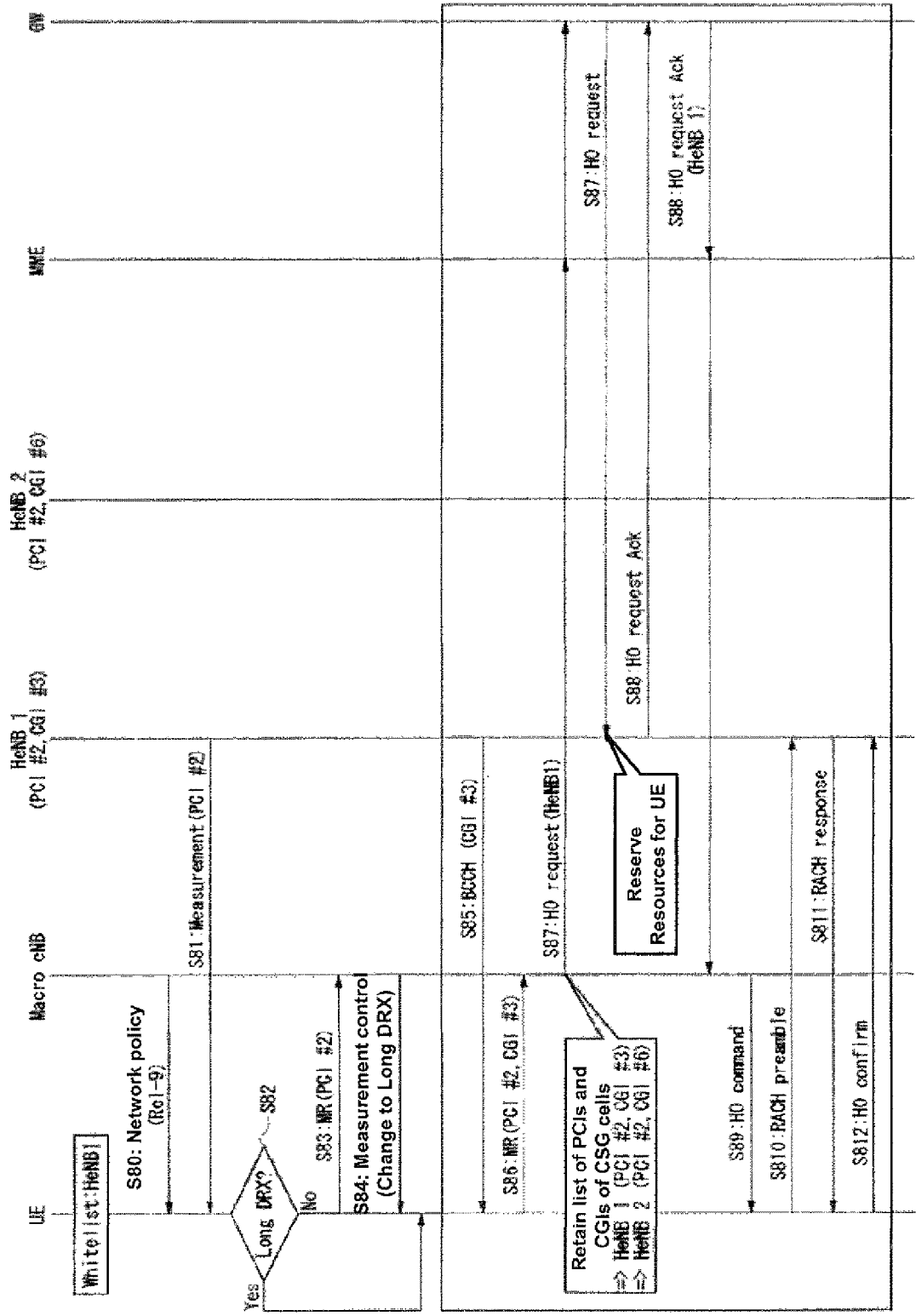
FIG. 18 is a sequence diagram for illustrating an operation of a wireless communication system according to the fourth embodiment.

FIG. 18 is a sequence diagram showing the operation of the entire wireless communication system according to the embodiment. As shown in FIG. 18, the terminal apparatus 1 receives the system information (BCCH) from the base station apparatus 2 (macro eNB) and identifies the network policy of the base station apparatus 2 (macro eNB) (S80). In this case, the network policy of the base station apparatus 2 (macro eNB) is identified as an eNB of Release 9.

The terminal apparatus 1 takes reception quality measurements of the home eNB (home eNB 1) (S81), and acquires the PCI (here, PCI #2). Determination is then made to whether the terminal apparatus 1 implements the long discontinuous reception (DRX) (S82).

If it is determined that the terminal apparatus 1 does not implement the long DRX, the terminal apparatus 1 adds only a PCI of the measured CSG cell to a reception quality measurement result, and transmits the measurement report (PCI #2) to the base station apparatus 2 (macro eNB). Upon receiving the measurement report from the terminal apparatus 1, the base station apparatus 2 (macro eNB) transmits a measurement control message for instructing the terminal apparatus 1 to implement the long DRX and acquire a CGI (i.e. to receive BCCH) of the CSG cell (S84). Instead, the base station apparatus 2 (macro eNB) may transmit a measurement control message with an instruction to measure another frequency (for example, f2) of the macro cell (inter-frequency measurement).

If it is determined that the terminal apparatus 1 implements the long DRX, and when it is determined that the measured cell is a CSG cell from the acquired PCI and a whitelist, the terminal apparatus 1 automatically receives BCCH of the CSG cell to acquire a CGI (S85). The terminal apparatus 1 then creates a measurement report MR (PCI #2, CGI #3) to which the PCI and the CGI are added, and transmits it to the base station apparatus 2 (macro eNB) (S86).

Upon receiving a measurement report from the terminal apparatus 1, the base station apparatus 2 (macro eNB) determines the corresponding CSG cell from the PCI and the COI added to the measurement report and a list of CSG cells retained by the base station apparatus 2, and transmits an HO request to a home eNB (home eNB 1) of the corresponding CSG cell (S87). If the handover of the terminal apparatus 1 is to be permitted, the home eNB 1 that has received the HO request reserves in advance wireless resources appropriate for services provided to the terminal apparatus 1, performs acceptance control, and transmits an ACK to the HO request via the MME/GW to the base station apparatus 2 (macro eNB) (S88).

Upon receiving the ACK to the HO request from the home eNB 1, the base station apparatus 2 (macro eNB) transmits an HO command for instructing the terminal apparatus 1 to transfer to the CSG cell 1 (S89), and the terminal apparatus 1 transmits a random access preamble to the specified home eNB (S810). After the home eNB transmits a random access response (S811) and synchronization is established, the terminal apparatus 1 transmits an HO confirmation to the home eNB 1 (S812).

Figure 19:
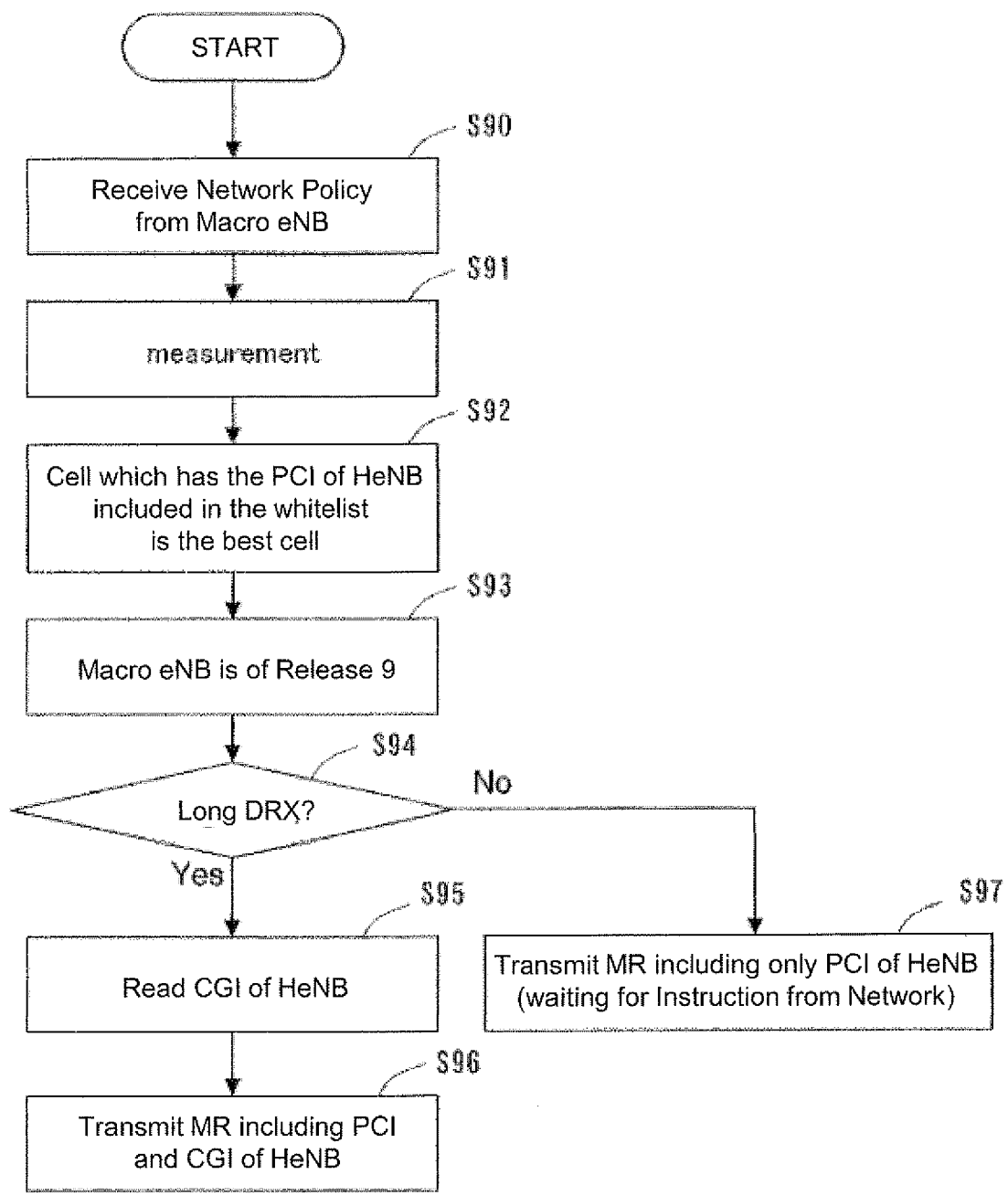
FIG. 19 is a flow chart for illustrating an operation of the terminal apparatus according to the fourth embodiment.

FIG. 19 is a flow chart showing the operation of the terminal apparatus 1 according to the embodiment. As shown in FIG. 19, the terminal apparatus 1 first receives a network policy included in system information from the base station apparatus 2 (macro eNB) (S90). Next, the terminal apparatus 1 takes reception quality measurements of a pilot channel of a home eNB (S91), and if a CSG cell that has the PCI of a home eNB contained in the whitelist is the best cell of the best reception qualify (S92), examination is made on the network policy.

If it is determined that the base station apparatus 2 (macro eNB) is a macro eNB of Release 9 (S93) as a result of the examination on the network policy, determination is made on whether or not the terminal apparatus 1 implements the long DRX (S94). If the terminal apparatus 1 implements the long DRX, the terminal apparatus 1 receives BCCH of the CSG cell to acquire a CGI (S95). The terminal apparatus 1 then creates a measurement report including the acquired PCI and CGI and a reception quality measurement result, and transmits the measurement report to the base station apparatus 2 (macro eNB) (S96). On the other hand, if the terminal apparatus 1 does not implement the long DRX, the terminal apparatus 1 creates a measurement report including the PCI and a reception quality measurement result, and transmits it to the base station apparatus 2 (macro eNB) (S97).

According to the wireless communication system according to the fourth embodiment, similar effects to the first embodiment can be achieved.

The embodiment is intended for a macro eNB of Release 9. In this case, since the base station apparatus 2 (macro eNB) supports a reliable handover to a CSG cell, it is conceivable that the base station apparatus 2 (macro eNB) provides a handover instruction after the base station apparatus 2 confirms that the CSG cell is accessible to the terminal apparatus 1. Therefore, upon receiving a measurement report of a home eNB from the terminal apparatus 1, it is conceivable that the base station apparatus 2 immediately instructs the terminal apparatus 1 to read a CGI of the home eNB. In this case, a CGI (if CGI) of the accessible CSG cell sent by the terminal in the first measurement report is redundant and may cause a problem of an increase of message size of a measurement report.

In this embodiment, therefore, it is possible to minimize the message size of the measurement report by sending only a PCI of a home eNB acquired during measurement in the first measurement report.

In particular, according to the wireless communication system according to the embodiment, considering the fact that in cases where the base station apparatus 2 (macro eNB) is a macro eNB of Release 9, the base station apparatus 2 immediately instructs the terminal apparatus 1 to read a CGI of a home eNB upon receiving a measurement report of the home eNB from the terminal apparatus 1, the terminal apparatus 1 sends only a PC1 of the home eNB acquired during measurement in the first measurement report. It is therefore possible to minimize the message size of the measurement report.

Embodiments according to the present invention have been described by way of illustration. The scope of the invention, however, is not limited thereto and alteration and modification can be made thereto without departing from the scope of the invention as defined by the appended claims.

For example, description has been made above to the cases where the base station apparatus 2 (macro eNB) transmits a network policy throughout the system by means of system information. The scope of the invention, however, is not limited thereto and the base station apparatus 2 (macro eNB) may transmit a network policy to the terminal apparatus 1 individually by means of a measurement control message.

Although currently possible preferred embodiments of the invention have been described above, it is understood that various modifications can be made to the embodiments and it is intended that all such modifications that fall within the true spirit and scope of the invention are covered by the attached claims.

INDUSTRIAL APPLICABILITY

As described above, the radio transmitting/receiving apparatus according to the present invention can effectively suppress wasteful signaling and prevent unnecessary resources from being reserved, and is useful for a technique for performing a handover from a macro cell to a CSG cell, and the like.

REFERENCE SIGNS LIST 1 terminal apparatus (UE)
2 base station apparatus (macro eNB)
10 reception unit
11 PCI acquisition unit
12 whitelist storage unit
13 determination unit
14 measurement unit
15 measurement report creating unit
16 transmission unit
17 network policy identifying unit
18 location information storage unit
19 DRX control unit
20 transmission unit
21 reception unit
22 CSG cell list storage unit
23 determination unit
24 HO request creating unit
25 network policy storage unit
26 system information creating unit
27 measurement control information creating unit
28 DRX changing instruction unit

The invention claimed is:
1. A radio transmitting/receiving apparatus comprising:
a reception unit which receives, from a macro cell base station, an instruction for handover to a femto cell contained in a macro cell and which receives, from a femto cell base station, a pilot channel signal for reception quality measurement at the femto cell and a synchronization channel signal for synchronization;
a storage unit which stores a list indicative of an accessible femto cell among femto cells contained in the macro cell;
a determination unit which determines whether or not a femto cell of handover destination is accessible based on a physical cell ID of the femto cell acquired from the received synchronization channel and the list;
a measurement report creating unit which adds a physical cell ID and a unique cell ID to a measurement report indicative of a result of reception quality measurements taken by means of the pilot channel signal, the physical cell ID being acquired from the synchronization channel and being indicative of a femto cell from which a signal is being received and the unique cell ID being for uniquely identifying a femto cell contained in the macro cell and being indicative of the femto cell of handover destination determined to he accessible; and a transmission unit which transmits the measurement report to the macro cell base station, wherein:

the reception unit can receive, from the macro cell base station, system information including a network policy relating to a handover from a macro cell to a femto cell or a measurement control message including the network policy, the determination unit has a function for examining a network policy of the macro cell base station, and the measurement report creating unit creates the measurement report depending on the network policy of the macro cell base station, the storage unit stores a physical cell ID and a location information of a previously accessed femto cell base station, the determination unit determines, if it is determined that a network policy of the macro cell base station does not support a reliable handover and is of aggressive one that performs a handover regardless of presence or absence of an access permission, whether or not a femto cell of handover destination is accessible based on a physical cell ID of the femto cell acquired from the current synchronization channel and current location information as well as the physical cell ID and the location information stored in the storage unit, and the measurement report creating unit adds to the measurement report, if it is determined that the femto cell of handover destination is accessible, the physical cell ID and a unique cell ID of the femto cell determined to be accessible.

2. The radio transmitting/receiving apparatus according to claim 1, wherein the measurement report creating unit adds to the measurement report, if it is determined that the femto cell of handover destination is not accessible, the physical cell ID of the femto cell determined to be inaccessible and a notification indicating that the femto cell is not accessible.

3. The radio transmitting/receiving apparatus according to claim 1, comprising a measurement unit which takes reception quality measurements on another frequency band managed by the macro cell base station if it is determined that the femto cell of handover destination is not accessible.

4. A terminal apparatus comprising the radio transmitting/receiving apparatus according to any one of claims 1-3.

5. A wireless communication system comprising:

the terminal apparatus according to claim 4;

and a base station apparatus comprising a radio transmitting/receiving apparatus comprising:

a reception unit which receives, from a WI urinal apparatus, a measurement report indicative of a result of reception quality measurements taken at a femto cell contained in a macro cell;

a handover request creating unit which creates a handover request for a femto cell of handover destination based on a physical cell ID and a unique cell ID of the femto cell of handover destination added to the measurement report, and a transmission unit which transmits, to the terminal apparatus, an instruction for handover to the femto cell based on a response to the handover request from the femto cell of handover destination.

6. A radio transmitting/receiving apparatus comprising:

a reception unit which receives, from a terminal apparatus, a measurement report indicative of a result of reception quality measurements taken at a femto cell contained in a macro cell;

a handover request creating unit which creates a handover request for a femto cell of handover destination based on a physical cell ID and a unique cell ID of the femto cell of handover destination added to the measurement report, and a transmission unit which transmits to the terminal apparatus, an instruction for handover to the femto cell based on a response to the handover request from the femto cell of handover destination, wherein:

the transmission unit transmits to the terminal apparatus, if the network policy does not support a reliable handover, an instruction to take reception quality measurements of a femto cell in another frequency band when the unique cell ID is not added to the measurement report.

7. A base station apparatus comprising the radio transmitting/receiving apparatus according to claim 6.

8. A radio transmitting/receiving method, comprising:

receiving, from a femto cell base station, a pilot channel signal for reception quality measurement at a femto cell contained in a macro cell and a synchronization channel signal for synchronization;

determining whether or not a femto cell of handover destination is accessible based on a physical cell ID of the femto cell acquired from the received synchronization channel and a list indicative of an accessible femto cell among femto cells contained in the macro cell;

adding a physical cell ID and a unique cell ID to a measurement report indicative of a result of reception quality measurements taken by means of the pilot channel signal, the physical cell ID being acquired from the synchronization channel and being indicative of a femto cell from which a signal is being received and the unique cell ID being for uniquely identifying a femto cell contained in the macro cell and being indicative of the femto cell of handover destination determined to be accessible;

transmitting the measurement report to a macro cell base station; and receiving, from the macro cell base station, an instruction for handover to the femto cell contained in the macro cell, the method further comprising:

receiving, from the macro cell base station, system information including a network policy relating to a handover from a macro cell to a femto cell or a measurement control message including the network policy, the determination unit has a function for examining a network policy of the macro cell base station, and creating the measurement report depending on the network policy of the macro cell base station, and the method further comprising:

storing a physical cell ID and a location information of a previously accessed femto cell base station, determining, if it is determined that a network policy of the macro cell base station does not support a reliable handover and is of aggressive one that performs a handover regardless of presence or absence of an access permission, whether or not a femto cell of handover destination is accessible based on a physical cell ID of the femto cell acquired from the current synchronization channel and current location information as well as the physical cell ID and the location information stored in the storage unit, and adding to the measurement report, if it is determined that the femto cell of handover destination is accessible, the physical cell ID and a unique cell ID of the femto cell determined to be accessible.

9. A radio transmitting/receiving method, comprising:

receiving, from a terminal apparatus, a measurement report indicative of a result of reception quality measurements taken at a femto cell contained in a macro cell;

creating a handover request for a femto cell of handover destination based on a physical cell ID and a unique cell ID of the femto cell of handover destination added to the measurement report, and transmitting, to the terminal apparatus, an instruction for handover to the femto cell based on a response to the handover request from the femto cell of handover destination, the method further comprising:

transmitting to the terminal apparatus, if the network policy does not support a reliable handover, an instruction to take reception quality measurements of a femto cell in another frequency band when the unique cell ID is not added to the measurement report.

* * * * *